United States Patent
Aggarwal et al.

(10) Patent No.: US 12,172,650 B2
(45) Date of Patent: Dec. 24, 2024

(54) ON-DEVICE GENERATION AND PERSONALIZATION OF AUTOMATED ASSISTANT SUGGESTION(S) VIA AN IN-VEHICLE COMPUTING DEVICE

(71) Applicant: GOOGLE LLC, Mountain View, CA (US)

(72) Inventors: Ankur Aggarwal, San Jose, CA (US); Yanhong Chen, Santa Clara, CA (US)

(73) Assignee: GOOGLE LLC, Mountain View, CA (US)

( * ) Notice: Subject to any disclaimer, the term of this patent is extended or adjusted under 35 U.S.C. 154(b) by 397 days.

(21) Appl. No.: 17/668,119

(22) Filed: Feb. 9, 2022

(65) Prior Publication Data

US 2023/0249695 A1 Aug. 10, 2023

(51) Int. Cl.
  *B60W 40/09* (2012.01)
  *B60K 35/00* (2024.01)
  *B60K 35/10* (2024.01)
  *B60K 35/28* (2024.01)
  *B60W 40/08* (2012.01)
  (Continued)

(52) U.S. Cl.
  CPC ......... *B60W 40/09* (2013.01); *G01C 21/3438* (2013.01); *G01C 21/3617* (2013.01); *B60W 2040/0809* (2013.01); *B60W 2040/0881* (2013.01); *B60W 2540/01* (2020.02)

(58) Field of Classification Search
  None
  See application file for complete search history.

(56) References Cited

U.S. PATENT DOCUMENTS 9,537,811 B2 * 1/2017 Allen .................. G06F 40/169
10,671,356 B2 * 6/2020 Makkar .................. G06F 8/36
(Continued)

FOREIGN PATENT DOCUMENTS

| CA | 2981429 | 4/2019 | |
| CN | 104484430 A * | 4/2015 | ........... G06Q 30/018 |
| WO | 2020112337 A1 | 6/2020 | |

OTHER PUBLICATIONS

European Patent Office; International Search Report and Written Opinion issued in Application No. PCT/US2022/036326; 20 pages; dated Oct. 11, 2022.

*Primary Examiner* — Jaime Figueroa
*Assistant Examiner* — Atticus A Cameron
(74) *Attorney, Agent, or Firm* — Gray Ice Higdon

(57) ABSTRACT

Implementations described herein relate to generating candidate suggestion(s) that are personalized to a given user locally at an in-vehicle computing device of a vehicle of the given user. For example, implementations can identify an occurrence of a given suggestion state, generate the candidate suggestion(s) that are personalized to the user for the given suggestion state, store the candidate suggestion(s) in on-device storage of the in-vehicle computing device in association with the given suggestion state, and cause a given one of the candidate suggestion(s) to be provided for presentation to the given user. Accordingly, upon a subsequent occurrence of the given suggestion state, implementations can obtain the candidate suggestion(s) stored in association with the given suggestion state, and cause the given one of the candidate suggestion(s), or an additional one of the candidate suggestion(s), to be provided for presentation to the given user.

15 Claims, 8 Drawing Sheets

(51) Int. Cl.
    *G01C 21/34*     (2006.01)
    *G01C 21/36*     (2006.01)
    *G05B 23/02*     (2006.01)

(56) References Cited

U.S. PATENT DOCUMENTS

| | | |
|---|---|---|
| 11,081,107 B2 * | 8/2021 | Gillespie ................ G06F 40/30 |
| 2010/0180200 A1 | 7/2010 | Donneau-Golencer et al. |
| 2014/0052681 A1 | 2/2014 | Nitz et al. |
| 2014/0108307 A1 | 4/2014 | Raghunathan et al. |
| 2016/0198306 A1 | 7/2016 | Miles et al. |
| 2019/0071101 A1 * | 3/2019 | Emura ................ G05D 1/0088 |
| 2022/0199079 A1 * | 6/2022 | Hanson ................ H04L 51/02 |

\* cited by examiner

ON-DEVICE GENERATION AND PERSONALIZATION OF AUTOMATED ASSISTANT SUGGESTION(S) VIA AN IN-VEHICLE COMPUTING DEVICE

BACKGROUND

Computing devices and their respective applications typically provide robust functionality to assist humans (referred to herein as "users") with various tasks. When a particular computing device is accessible to an automated assistant, the automated assistant can assist the users in controlling these applications by performing the various tasks on behalf of the users. In some instances, the automated assistant may proactively provide suggestions to familiarize the users with a given task that the automated assistant can perform on behalf of the users by controlling these applications. In other instances, the automated assistant may reactively provide suggestions to inform the users that the automated assistant could have performed a given task that the user just manually performed by controlling these applications For example, assume the automated assistant is executing at least in part at an in-vehicle computing of a vehicle of a given user. Further assume that the automated assistant hosts or has access to a suggestion system that is utilized to generate suggestions to be provided for presentation to the given user of the vehicle. In this example, the automated assistant can generate suggestions for controlling various other applications that are also accessible at the in-vehicle computing device, such as a telephone application, a media application, a navigation application, and/or other applications. Accordingly, the automated assistant can proactively generate a suggestion of "Call Mom" if the given user typically utilizes the telephone application to call a contact entry "Mom" in a certain contextual scenario, or reactively generate a suggestion of "Redial Mom" if the given user has a recently missed call from the contact entry "Mom".

However, in many cases, the suggestion system utilized by the automated assistant to generate the suggestions may be a remote system (e.g., a server) from the in-vehicle computing device. As a result, computational resources and/or network resources may be unnecessarily consumed by the in-vehicle computing device in generating and transmitting requests to the remote system, and receiving the suggestions from the remote system. Further, security of user data may be unnecessarily compromised by transmitting these requests to the remote system and away from the in-vehicle computing device for use in generating the suggestions. Moreover, latency may be unnecessarily introduced at least in part due to time associated with transmitting the requests to the remote system, and receiving the suggestions from the remote system. Accordingly, there is a need in the art for an improved suggestion system executing at in-vehicle computing devices of vehicles.

SUMMARY

Implementations described herein relate to generating candidate suggestion(s) locally at an in-vehicle computing device of a vehicle of a given user. The candidate suggestion(s) can be personalized to the given user for various suggestion states, and provided for presentation to the given user via the in-vehicle computing device. Implementations can identify an occurrence of a given suggestion state, generate the candidate suggestion(s) that are personalized to the user for the given suggestion state, store the candidate suggestion(s) in on-device storage of the in-vehicle computing device in association with the given suggestion state, and cause a given one of the candidate suggestion(s) to be provided for presentation to the given user. This process can be repeated for a plurality of disparate suggestion states that are in addition to the given suggestion state. Accordingly, upon identifying a subsequent occurrence of the given suggestion state or another one of the plurality of disparate suggestion states, implementations can obtain the candidate suggestion(s) stored in association with the given suggestion state, and cause the given one of the candidate suggestion(s), or an additional one of the candidate suggestion(s), to be provided for presentation to the given user in a quick and efficient manner.

For example, assume a text message is received from a contact entry of "Brother" at a mobile computing device of the given user, and assume that the mobile computing device of the given user is communicatively coupled to the in-vehicle computing device of the vehicle of the given user. In this example, further assume that a suggestion system identifies an occurrence of a contextual suggestion state corresponding to an incoming text message suggestion state. As a result, the suggestion system can generate one or more candidate suggestions, such as "Respond to Brother's text message" or the like, and cause one or more of the candidate suggestions to be provided for visual and/or audible presentation to the given user via the in-vehicle computing device. Notably, the suggestion of "Respond to Brother's text message" is personalized to the given user in that it references the contact entry of "Brother" and is specific to the incoming text message suggestion state in that it provides an indication of some action for the given user to take responsive to the text message.

In this example, the occurrence of the incoming text message suggestion state can be identified based on one or more contextual signals that characterize a state of a text messaging application, such as a state that an incoming text message was received. Although the above example is described with respect to identifying the occurrence of the suggestion state based on the one or more contextual signals of the text messaging application, it should be understood that is for the sake of example and is not meant to be limiting. For instance, the suggestion system can consider contextual signals from any other application that is accessible at the in-vehicle computing and/or any other computing device communicatively coupled thereto (e.g., the mobile computing device of the user). Moreover, the suggestion system can additionally, or alternatively, consider one or more contextual signals that characterize a state of the given user of the vehicle and/or one or more characterize a state of the vehicle. Accordingly, the suggestion system can consider various contextual signals from various sources that characterize states of various applications, persons, and/or vehicles in identifying occurrences of the suggestion state.

As noted above, in this example, the incoming text message suggestion state may correspond to a contextual suggestion state in that the one or more candidate suggestions are triggered for generation by the suggestion system in response to identifying the occurrence of the incoming text message suggestion state. In other examples, the incoming text message suggestion state may additionally, or alternatively, correspond to a periodic suggestion state. In these implementations, the occurrence of the incoming text message suggestion state may be identified in the same or similar manner as the contextual suggestion state, but the one or more candidate suggestions are triggered for generation by the suggestion system in response to identifying the occurrence of the incoming text message suggestion state when a duration of time has elapsed, rather than simply in response identifying the occurrence of the incoming text message suggestion state. Put another way, techniques described herein can be adapted to be performed at periodic and/or aperiodic intervals of time to further reduce a quantity of computational resources that are consumed in identifying occurrences of suggestion states, generating the suggestions, and causing the suggestions to be provided. This may also reduce driver distraction by preventing the suggestion(s) from being presented too frequently. In various implementations, an original equipment manufacturer (OEM) of the vehicle can provide an indication of whether to employ contextual suggestion states, periodic suggestion states, or both for the vehicle.

In various implementations, the given suggestion state described herein (e.g., the incoming text message suggestion state) may be one of a plurality of disparate suggestion states. Each of the plurality of disparate suggestion states can represent a different contextual scenario and can be defined with varying degrees of granularity based on different contextual signals that are available to the system. Continuing with the above example, the incoming text message suggestion state may be defined more broadly as an incoming electronic communication suggestion state since the incoming text message is an incoming electronic communication. In this example, the broader incoming electronic communication suggestion state can also be identified based on an incoming phone call at a phone application, an incoming email from an email application, and/or other incoming electronic communications. Additionally, or alternatively, the incoming text message suggestion state may be defined more narrowly as an incoming text message from "Brother" suggestion state since the incoming text message is from the contact entry of "Brother". In this example, the narrow incoming text message from "Brother" may not include instances where text messages are received from other contact entries of the given user. Accordingly, in this example, the suggestions may be even further personalized in that they may more accurately reflect how the given user typically responds to incoming text message from the contact entry of "Brother" as compared to how the given user typically responds to text messages from other contact entries.

In various implementations, in generating the one or more candidate suggestions, the suggestion system can utilize one or more suggestion templates that are stored in association with the various disparate suggestion states. One or more of the suggestion templates may include one or more corresponding placeholders. In these implementations, the suggestion system can identify corresponding personalized identifiers that can be utilized in populating the corresponding placeholders. The corresponding personalized identifiers can be obtained from, for example, a user profile of the given user and/or one or more databases that are accessible to the in-vehicle computing device. Continuing with the above example where the suggestion of "Respond to Brother's text message" is provided for presentation to the user, a corresponding suggestion template can be "Respond to [CONTACT ENTRY]'s text message", wherein [CONTACT ENTRY] is a corresponding placeholder and "Brother" is the personalized identifier obtained from the user profile that is utilized in populating the corresponding placeholder. In some versions of those implementations, searching of the user profile may be restricted to a type of the corresponding placeholder. For instance, in the above example, searching the user profiles may be limited to contact entries of the given user in a phone application, an email application, and/or any other data having a contact entry type. Although the above example is described with respect to a [CONTACT ENTRY] placeholder, it should be understood that is for the sake of example and is not meant to be limiting. For instance, other placeholders for other suggestions may include [ARTIST], [SONG], and [MUSIC STREAMING APPLICATION] for media-related suggestions, [SMART DEVICE NAME] for smart device-related suggestions, [ROUTINE NAME] for assistant routine-related suggestions, and so on.

In various implementations, such as when the one or more candidate suggestions include multiple suggestions, the suggestion system can rank the one or more candidate suggestions, and select a given candidate suggestion, from among the one or more candidate suggestions, based on the ranking. In some implementations, the suggestion system can process the one or more candidate suggestions using a ranking machine learning (ML) model to rank the one or more candidate suggestions. In some versions of those implementations, the ranking ML model may be a global ranking ML model that is not specific to the given user of the vehicle, whereas in other implementations, the ranking ML model may be a personalized ranking ML model that is specific to the given user of the vehicle. In additional or alternative implementations, the one or more candidate suggestions can be ranked according to one or more ranking criteria. In various implementations, and prior to storing any of the one or more candidate suggestions, the suggestion system can utilize one or more known de-duplicating techniques to ensure that any candidate suggestions considered for presentation to the given user are semantically diverse.

In various implementations, the suggestion system can monitor for occurrences of multiple suggestions states at any given time instance. Accordingly, although the above example is described with respect to providing a single suggestion for a single suggestion state, it should be understood that is for the sake of brevity and is not meant to be limiting. For instance, the suggestion system can cause multiple suggestions to be provided for presentation to the user for a given suggestion state. Further, the suggestion system can monitor for occurrences of multiple suggestion states, and cause one or multiple suggestions to be provided for presentation to the user for each of the multiple suggestion states.

By using the techniques described herein, various technical advantages can be achieved. As one non-limiting example, techniques described herein enable a system to generate one or more candidate suggestions locally at an in-vehicle computing device. The one or more candidate suggestions can be personalized to a given user for various different suggestion states. Further, upon identifying subsequent occurrences of the various suggestion states, the one or more candidate suggestions can quickly and efficiently be retrieved from on-device storage of the in-vehicle computing device. Accordingly, security of user data that may be utilized in generating the one or more candidate suggestions can be increased by generating the one or more candidate suggestions locally at an in-vehicle computing device since data need not be transmitted away from the in-vehicle computing device to generate the one or more candidate suggestions. Further, consumption of network resources can be reduced since the data need not be transmitted away from the in-vehicle computing device. Moreover, latency in providing a given candidate suggestion, from the one or more suggestions, can be reduced by generating the one or more candidate suggestions locally at the in-vehicle computing device and/or retrieving the one or more suggestions from the on-device storage of the in-vehicle computing device.

The above description is provided as an overview of only some implementations disclosed herein. Those implementations, and other implementations, are described in additional detail herein.

DETAILED DESCRIPTION OF THE DRAWINGS

Figure 1:
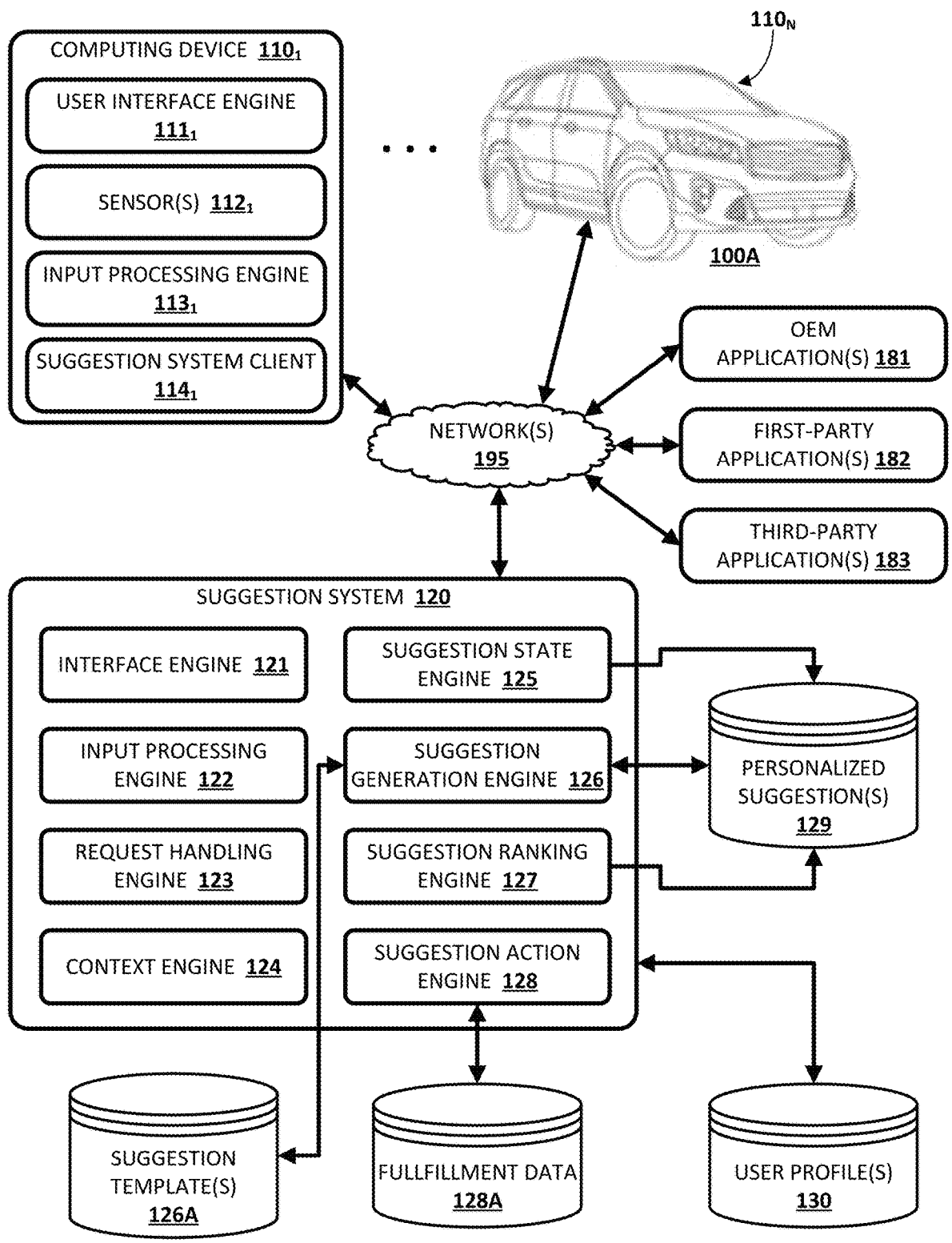
FIG. 1 depicts a block diagram of an example hardware and software environment that demonstrates various aspects of the present disclosure, and in which implementations disclosed herein can be implemented.

Turning now to FIG. 1, an environment in which one or more selected aspects of the present disclosure may be implemented is depicted. The example environment includes a plurality of computing devices $110_{1-N}$, a suggestion system 120 of an automated assistant application, a vehicle 100A, one or more original equipment manufacturer (OEM) applications 181, one or more first-party applications 182, and one or more third-party applications 183. Each of these components $110_{1-N}$, 120, 181, 182, and 183 may communicate, for example, through one or more networks indicated generally by 195. The one or more networks can include wired or wireless networks, such as local area networks (LANs) including Wi-Fi, Bluetooth, near-field communication, and/or other LANs, wide area networks (WANs) including the internet, and/or any other network to facilitate communication between the components depicted in FIG. 1.

In various implementations, a user may operate one or more of the computing devices $110_{1-N}$ to interact with other components depicted in FIG. 1. The computing devices $110_{1-N}$ may be, for example, a desktop computing device, a laptop computing device, a tablet computing device, a mobile phone computing device, an in-vehicle computing device of the vehicle 100A (e.g., an in-vehicle communications system, an in-vehicle entertainment system, and/or an in-vehicle navigation system as shown with respect to $110_N$), or a wearable apparatus that includes a computing device, such as a head-mounted display ("HMD") that provides an augmented reality ("AR") or virtual reality ("VR") immersive computing experience, a "smart" watch, and so forth. Additional and/or alternative computing devices may be provided.

Each of the computing devices $110_{1-N}$ and the suggestion system 120 may include one or more memories for storage of data and software applications (e.g., one or more of the OEM applications 181, one or more of the first-party applications 182, and/or one or more of the third-party applications 183), one or more processors for accessing data and executing the software applications, and other components that facilitate communication over one or more of the networks 195. The operations performed by one or more of the computing devices $110_{1-N}$ and/or the suggestion system 120 may be distributed across multiple computer systems. For example, the suggestion system 120 may be implemented as, for example, computer programs running exclusively on or distributed across one or more computers in one or more locations that are communicatively coupled to each other over one or more of the networks 195.

One or more of the components $110_{1-N}$, 120, 181, 182, and 183 may include a variety of different components that may be used, for instance, to generate suggestions locally at an in-vehicle computing device as described herein. For example, a computing device $110_1$ may include user interface engine 1111 to detect and process user input (e.g., spoken utterances, typed input, and/or touch input) directed to the computing device $110_1$. As another example, the computing device $110_1$ may include one or more sensors 1121 to generate corresponding sensor data. The one or more sensors can include, for example, global positioning system ("GPS") sensors to generate GPS data, vision components to generate vision data in a field of view of the vision components, microphones to generate audio data based on spoken utterances captured in an environment of the computing device $110_1$, and/or other sensors to generate corresponding sensor data.

As yet another example, the computing device $110_1$ may operate an input processing engine 1131 (e.g., which may be standalone or part of another application, such as part of an automated assistant application) to interpret various user inputs received at the computing device $110_1$. For example, the input processing engine 1131 can cause audio data that captures a spoken utterance and that is generated by microphone(s) of the client device $110_1$ to be processed using automatic speech recognition (ASR) model(s) (e.g., a recurrent neural network (RNN) model, a transformer model, and/or any other ML model capable of performing ASR) to generate ASR output. Further, the input processing engine 1131 can cause the ASR output (or typed input) to be processed using natural language understanding (NLU) model(s) (e.g., a long short-term memory (LSTM), gated recurrent unit (GRU), and/or any other type of RNN or other ML model capable of performing NLU) and/or grammar-based NLU rule(s) to generate NLU output. Moreover, the input processing engine 1131 can cause the NLU output to be processed using fulfillment model(s) and/or fulfillment rule(s) to obtain one or more candidate responses that are responsive to the user input, such as action(s) to be performed by the automated assistant based on the user input, content item(s) to be provided for presentation to the user based on the user input, etc. In implementations where textual content is to be audibly rendered responsive to the spoken utterance or typed input, the user interface engine 1111 can cause the textual content to be processed using text-to-speech model(s) to generate synthesized speech audio data that includes computer-generated synthesized speech capturing the content. The synthesized speech audio data can be audibly rendered for presentation to the user via speaker(s) of the computing device $110_1$. In implementations where visual content is to be visually rendered responsive to the spoken utterance or typed input, the user interface engine $111_1$ can cause the visual content to be to be visually rendered for presentation to the user via a display of the $110_1$.

In various implementations, the ASR output can include, for example, one or more speech hypotheses (e.g., term hypotheses and/or transcription hypotheses) that are predicted to correspond to the voice activity and/or the spoken utterance of the user captured in the audio data, one or more corresponding predicted values (e.g., probabilities, log likelihoods, and/or other values) for each of the one or more speech hypotheses, a plurality of phonemes that are predicted to correspond to the voice activity and/or the spoken utterance of the user captured in the audio data, and/or other ASR output. In some versions of those implementations, the input processing engine $113_1$ can cause one or more of speech hypotheses to be selected as recognized text that corresponds to the spoken utterance (e.g., based on the corresponding predicted values).

In various implementations, the NLU output can include, for example, annotated recognized text that includes one or more annotations of the recognized text for one or more (e.g., all) of the terms of the recognized text. For example, the input processing engine $113_1$ can cause a part of speech tagger (not depicted) that is configured to annotate terms with their grammatical roles to be employed. Additionally, or alternatively, the input processing engine $113_1$ can cause an entity tagger (not depicted) that is configured to annotate entity references in one or more segments of the recognized text to be employed. The entity references can include, for instance, references to people (including, for instance, literary characters, celebrities, public figures, etc.), organizations, locations (real and imaginary), and so forth. In some implementations, data about entities may be stored in one or more databases, such as in a knowledge graph (not depicted). In some implementations, the knowledge graph may include nodes that represent known entities (and in some cases, entity attributes), as well as edges that connect the nodes and represent relationships between the entities. The entity tagger may annotate references to an entity at a high level of granularity (e.g., to enable identification of all references to an entity class such as people) and/or a lower level of granularity (e.g., to enable identification of all references to a particular entity such as a particular person). The entity tagger may rely on content of the natural language input to resolve a particular entity and/or may optionally communicate with a knowledge graph or other entity database to resolve a particular entity.

Additionally, or alternatively, the input processing engine $113_1$ can cause a coreference resolver (not depicted) that is configured to group, or "cluster," references to the same entity based on one or more contextual cues to be employed. As one non-limiting example, the coreference resolver may be utilized to resolve the term "that" to a particular light or indicator associated with operation of the vehicle 100A in the natural language input "what's that light?", based on a corresponding sensor data instance generated by vehicle sensor(s) that resulted in the particular light or indicator associated with operation of the vehicle 100A being generated. In some implementations, one or more components utilized by the input processing engine $113_1$ may rely on annotations from one or more other components utilized by the input processing engine $113_1$. For example, in some implementations the entity tagger may rely on annotations from the coreference resolver in annotating all mentions to a particular entity. Also, for example, in some implementations, the coreference resolver may rely on annotations from the entity tagger in clustering references to the same entity.

As yet another example, the computing device $110_1$ may operate a suggestion system client $114_1$ (e.g., which may be standalone or part of another application, such as part of an automated assistant application) to interact with the suggestion system 120. Further, an additional computing device $110_N$ may take the form of an in-vehicle computing device of the vehicle 100A. Although not depicted for the sake of brevity, the additional computing device $110_N$ may include the same or similar components as the computing device $110_1$. For example, the additional computing device $110_N$ may include respective instances of a user interface engine to detect and process user input, one or more sensors to generate corresponding vehicle sensor data instances of vehicle sensor data, an input processing engine, and/or a suggestion system client to interact with the suggestion system 120. In this example, the one or more sensors can include vehicle sensors, such as tire pressure sensors to generate tire pressure data for tires of the vehicle 100A, airflow sensors to generate airflow data for an air conditioning system of the vehicle 100A, vehicle speed sensors to generate vehicle speed data for the vehicle 100A, energy sensors to generate energy source data for an energy source of the vehicle 100A, transmission sensors to generate transmission data for a transmission of the vehicle 100A, and/or any other sensors that are integral to the vehicle 100A and/or the additional computing device $110_N$ of the vehicle 100A. Moreover, although only the computing device $110_1$ and additional computing device 110N are depicted in FIG. 1, it should be understood that is for the sake of example and additional or alternative computing devices may be provided.

In various implementations, the suggestion system 120 may include interface engine 121, input processing engine 122, request handling engine 123, context engine 124, suggestion state engine 125, suggestion generation engine 126, suggestion ranking engine 127, and suggestion action engine 128 as shown in FIG. 1. In some implementations, one or more of the engines 121-128 of the suggestion system 120 may be omitted. In some implementations, all or aspects of one or more of the engines 121-128 of the suggestion system 120 may be combined. In some implementations, one or more of the engines 121-128 of the suggestion system 120 may be implemented in a component that is executed, in part or exclusively, remotely from one or more of the computing devices $110_{1-N}$. In some implementations, one or more of the engines 121-128 of the suggestion system 120, or any operative portion thereof, may be implemented in a component that is executed, in part or exclusively, locally by one or more of the computing devices $110_{1-N}$, such as locally at an in-vehicle computing device as described herein.

Figure 2:
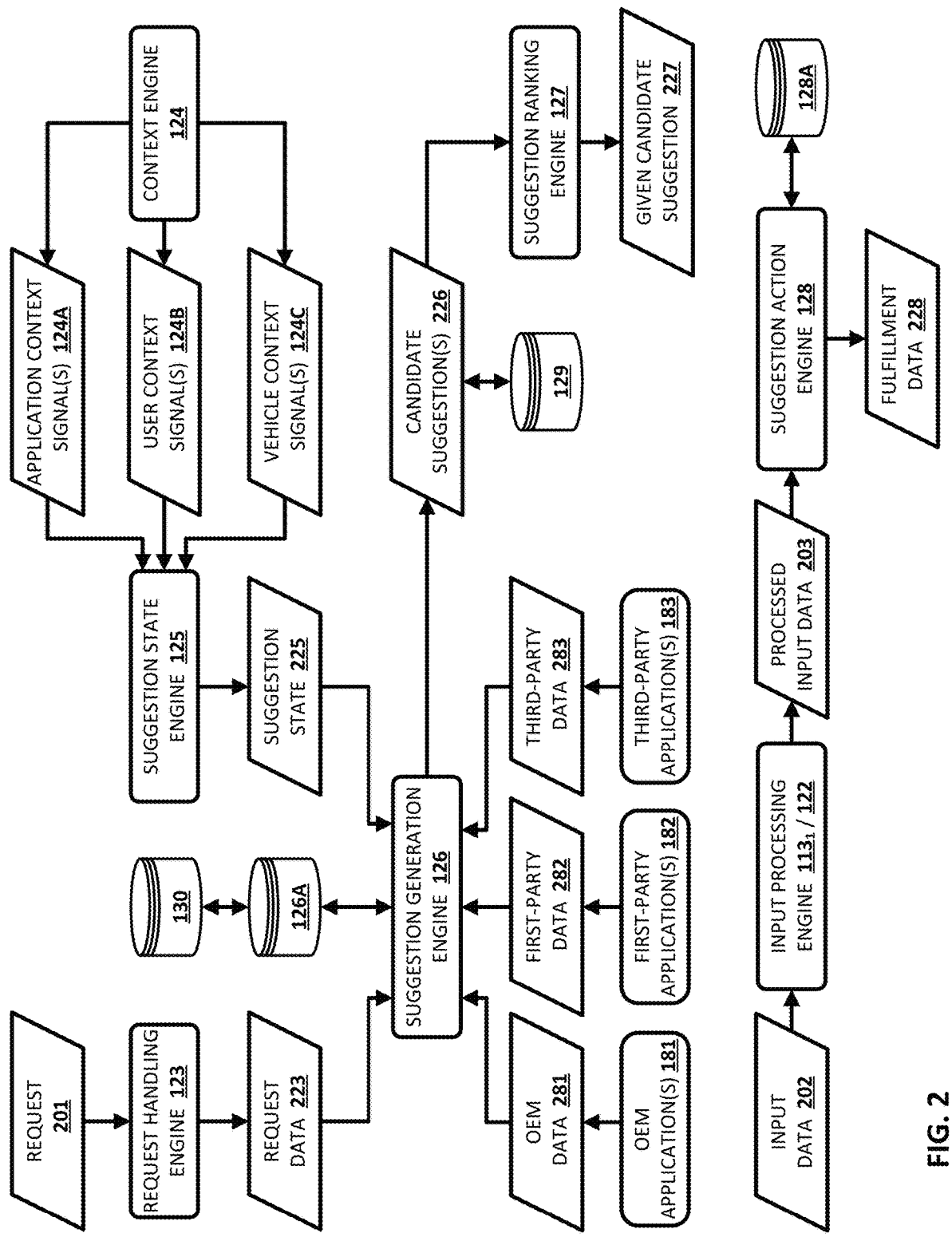
FIG. 2 depicts an example process flow of generating suggestions locally at an in-vehicle computing device that demonstrates various aspects of FIG. 1, in accordance with various implementations.

Referring to FIG. 2, an example process flow of generating suggestions locally at an in-vehicle computing device that demonstrates various aspects of FIG. 1 is depicted. The interface engine 121 (not depicted in FIG. 2) can facilitate the exchange of data to and/or from the one or more of the engines 121-128 depicted in FIGS. 1 and 2. For the sake of example, assume that a request 201 for suggestions is received by the suggestion system 120. The request handling engine 123 can process the request 201 to generate request data 223, and provide the request data 223 to the suggestion generation engine 126. Notably, the request 201 can be a periodic request for suggestions that is generated based on determining that a duration of time has elapsed (e.g., every two minutes, every five minutes, every fifteen minutes, etc.) and/or a contextual request for suggestions that is generated based on detecting one or more contextual signals (e.g., detected via the context engine 124).

The context engine 124 can obtain a plurality of contextual signals from various sources. For example, the context engine 124 can obtain one or more application context signals 124A that characterize a state of one or more applications accessible at an in-vehicle computing device of the vehicle 100A, one or more user context signals 124B that characterize a state of the given user of the vehicle 100A, and/or one or more vehicle context signals 124C that characterize a state of the vehicle 124C. Further, the context engine 124 can provide one or more of the plurality of contextual signals from the various sources to the suggestion engine 125, and the suggestion state engine 125 can identify a suggestion state based on the one or more of the plurality of contextual signals. These contextual signals and identifying suggestion states based thereon is described in more detail herein (e.g., with respect to FIGS. 3 and 4). Moreover, the suggestion state engine 125 can provide the suggestion state 225 to the suggestion generation engine 126.

The suggestion generation engine 126 can generate one or more candidate suggestions 226 responsive to the request 201. Each of the one or more candidate suggestions 226 can be personalized to the given user of the vehicle 100A and for the suggestion state 225. Put another way, the one or more candidate suggestions 226 may vary from user-to-user and from suggestion state-to-suggestion state. In some implementations, in generating the one or more candidate suggestions 226, the suggestion generation engine 126 can obtain one or more suggestion templates (e.g., from suggestion template(s) database 126A), and populate one or more corresponding placeholders included in one or more of the suggestion templates with user profile data of a user profile of the given user (e.g., stored in user profile(s) database 130). In additional or alternative implementations, in generating the one or more candidate suggestions 226, the suggestion generation engine 126 can utilize OEM data 281 from one or more OEM applications 181, first-party data 282 from one or more first-party applications 182, and/or third-party data 283 from one or more third-party applications 183, in determining which suggestion template(s) can be utilized, such as determining which applications (e.g., first-party application(s) 182 and/or third-party applications 183 that are accessible by the in-vehicle computing device), content being currently displayed by an OEM at the in-vehicle computing device via the OEM application(s) 181, etc. The data from these various applications can also be utilized in obtaining the various context signals described above. Generating the one or more candidate suggestions 226 is described in more detail herein (e.g., with respect to FIGS. 3 and 5).

Further, the suggestion engine 126 can cause the one or more candidate suggestions 226 to be stored in storage of the in-vehicle computing device (e.g., stored in personalized suggestion(s) database 129), such as random access memory of the in-vehicle computing device, a hard drive connected to the in-vehicle computing device, and/or other storage devices of the in-vehicle computing devices. Accordingly, upon receiving a subsequent request for suggestions in the same suggestion state, the suggestion generation engine 126 can quickly and efficiently obtain the one or more candidate suggestions 226 to reduce latency in providing a given candidate suggestion (e.g., as described with respect to FIG. 3).

The suggestion ranking engine 127 can rank the one or more candidate suggestions 226, and select a given candidate suggestion 227, from among the one or more candidate suggestions, to be provided for presentation to the user visually and/or audibly. In some implementations, the suggestion ranking engine 127 can utilize one or more ranking machine learning (ML) models that processes the one or more candidate suggestions 226 to generate a ranking thereof, and the given candidate suggestion 227 can be selected based on the ranking. The one or more ranking ML models can include, for example, a global ranking ML model that is not specific to the given user of the vehicle 100A and/or a personalized ranking ML model that is specific to the given user of the vehicle 100A. In additional or alternative implementations, the suggestion ranking engine 127 can utilize one or more ranking criteria to rank the one or more candidate suggestions 226, and the given candidate suggestion 227 can be selected based on the ranking. In various implementations, and as described in more detail with respect to FIGS. 3 and 5, the suggestion system 120 can employ various de-duplicating techniques to ensure the one or more candidate suggestions 226 stored in association with the suggestion state 225 and/or considered for the given candidate suggestion 227 are semantically diverse.

Further assume that, in response to causing the given candidate suggestion 227 to be provided for presentation to the given user of the vehicle 100A, the given user directs input to the given candidate suggestion 227. The input can be, for example, a spoken utterance that includes one or more terms of the given candidate suggestion 227, touch input that is directed to the given candidate suggestion 227 being displayed at a display of the in-vehicle computing device, and/or any other input that is directed to the given candidate suggestion 227. The input directed to the given candidate suggestion 227 can be captured in input data 202. The input processing engine 1131/122 can process the input data 202 in various manners depending on a type of the input (e.g., spoken and/or touch) to generate processed input data 203. The suggestion action engine 128 can process the processed input data 203 to generate fulfillment data 228. In some implementations, the suggestion action engine 128 can generate and transmit one or more structured requests to various applications (e.g., the first-party application(s) 182 and/or the third-party application(s) 183), and receive the fulfillment data 228 responsive to transmitting the one or more structured requests. In additional or alternative implementations, the fulfillment data 228 may be pre-cached in one or more databases (e.g., fulfillment data 128A) to reduce latency in providing the given candidate suggestion 227 for presentation to the user. Accordingly, in response to receiving the input, the in-vehicle computing device and/or an additional computing device in communication with the in-vehicle computing device can cause one or more actions to be performed based on the fulfillment data 228 for the given candidate suggestion 227.

In various implementations, the suggestion system 120 can identify a latency measure associated with causing the given candidate suggestion 227 to be provided for presentation to the given user via the in-vehicle computing device. The latency measure can represent, for example, a duration of time from a first time instance that the request 201 is received to a subsequent, second time instance that the given candidate suggestion 227 is provided for presentation to the given user. Further, the suggestion system 120 can utilize the latency measure to modify a quantity of the one or more candidate suggestions that are stored in association with the given suggestion state or one or more additional suggestion states, and/or utilized in any other manner to modify performance of the suggestion system 120. Accordingly, the suggestion system 120 can monitor these latency measures over time to further increase efficiency in causing the suggestions to be provided for presentation to the given user of the vehicle 100A.

In various implementations, the suggestion system 120 can utilize the user input directed to the given candidate suggestion 227 (or lack thereof) as a feedback signal to update a ranking of the one or more candidate suggestions 226. For example, assume that the given user directed input to the given candidate suggestion 227 for the suggestion state 225. In this example, the input can be utilized as a signal to indicate that the given candidate suggestion 227 was beneficial to the given user. As a result, upon identifying a subsequent occurrence of the suggestion state 225, the suggestion system 120 can bias a ranking of the one or more candidate suggestions 226 towards the given candidate suggestion 227. In contrast, assume that the given user did not direct any input to the given candidate suggestion 227 for the suggestion state 225. In this example, the input can be utilized as a signal to indicate that the given candidate suggestion 227 was not beneficial to the given user. As a result, upon identifying a subsequent occurrence of the suggestion state 225, the suggestion system 120 can bias a ranking of the one or more candidate suggestions 226 away from the given candidate suggestion 227 and/or towards other candidate suggestions for the suggestion state 225.

Figure 3:
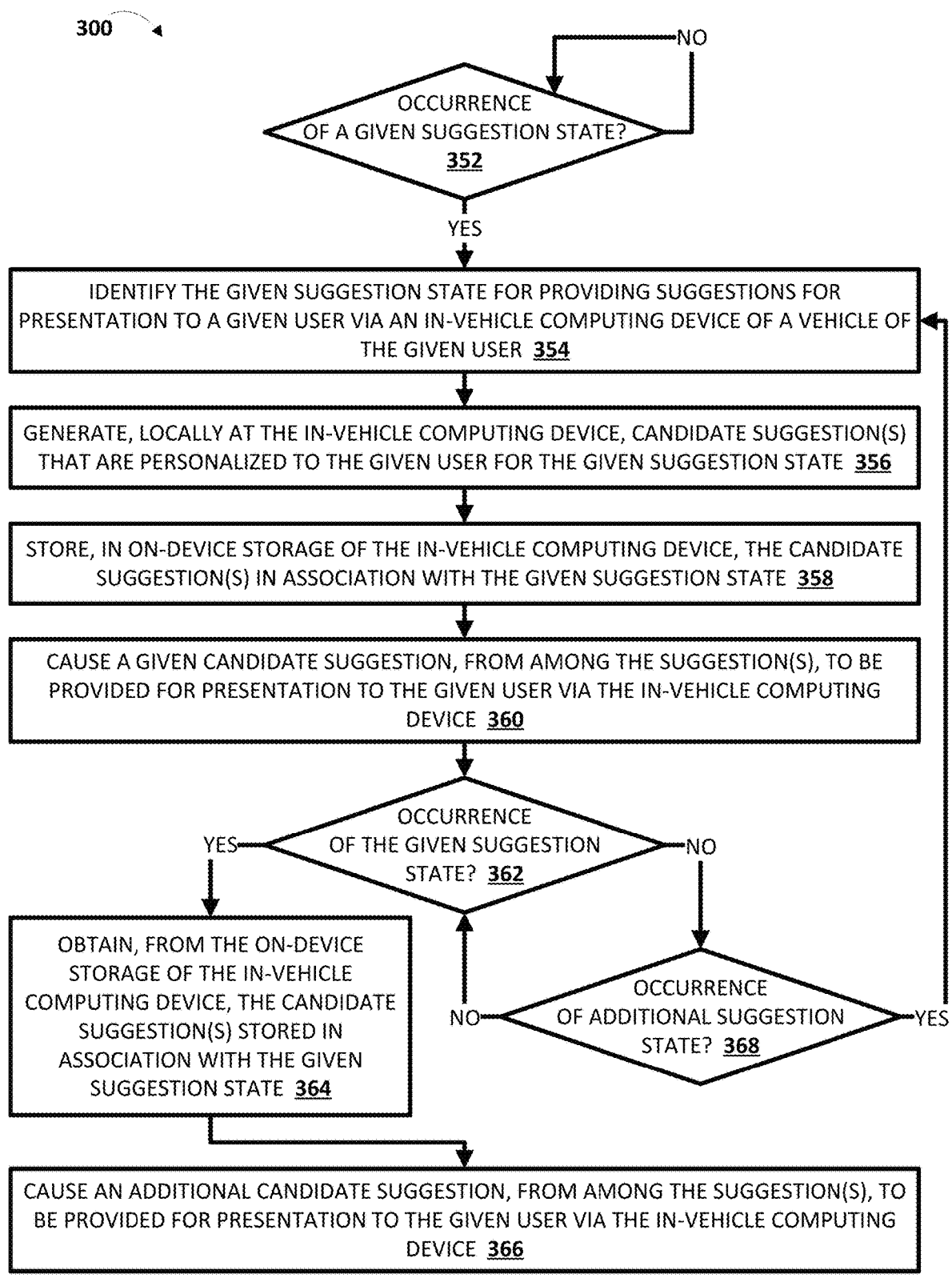
FIG. 3 depicts a flowchart illustrating an example method of generating suggestions locally at an in-vehicle computing device, in accordance with various implementations.

Turning now to FIG. 3, a flowchart illustrating an example method 300 of generating suggestions locally at an in-vehicle computing device is depicted. For convenience, the operations of the method 300 are described with reference to a system that performs the operations. This system of the method 300 includes at least one processor, at least one memory, and/or other component(s) of computing device(s) (e.g., computing device(s) $110_{1-N}$ of FIG. 1, suggestion system 120 of FIG. 1, computing device 710 of FIG. 7, remote server(s), and/or other computing devices). While operations of the method 300 are shown in a particular order, this is not meant to be limiting. One or more operations may be reordered, omitted, and/or added.

At block 352, the system determines whether there is an occurrence of a given suggestion state for providing suggestions for presentation to a given user. The given suggestion state may be one of a plurality of disparate suggestion states. Each of the plurality of suggestion states can represent a different contextual scenario and can be defined with varying degrees of granularity based on different contextual signals that are available to the system. Accordingly, the occurrence of the given suggestion state can trigger providing of the suggestions for presentation to the given user in these different contextual scenarios. Further, the system may monitor for occurrences of each of the plurality of disparate suggestion states during a single iteration of the method 300 of FIG. 3 and/or additional iterations of the method 300 of FIG. 3 that are specific to each of the plurality of disparate suggestion states. The suggestion states and determining whether there is an occurrence of the given suggestion state is described in more detail herein (e.g., with respect to FIG. 4). If, at an iteration of block 352, the system determines there is not an occurrence of the given suggestion state, then the system continues monitoring for an occurrence of the given suggestion state at block 352. If, at an iteration of block 352, the system determines there is an occurrence of the given suggestion state, then the system proceeds to block 354.

At block 354, the system identifies the given suggestion state for providing suggestions for presentation to a given user via an in-vehicle computing device of a vehicle of the given user. In some implementations, the given suggestion state can be a contextual suggestion state that is identified in response to detecting one or more contextual signals that trigger providing of the suggestions for presentation to the user. In these implementations, the one or more contextual signals can include, for example, one or more application contextual signals associated with one or more applications that are accessible by the in-vehicle computing device, one or more given user contextual signals associated with the given user of the vehicle, one or more vehicle contextual signals associated with the vehicle, and/or other contextual signals. These various contextual signals and the utilization thereof in identifying the given suggestion state is described in more detail herein (e.g., with respect to FIG. 4). In additional or alternative implementations, the given suggestion state can be a periodic suggestion state that is identified in response to determining a threshold duration of time has elapsed that triggers providing of the suggestions for presentation to the user. In these implementations, one or more of the contextual signals described above that are detected when threshold duration of time elapses can be utilized in identifying the given suggestion state as in more detail herein (e.g., with respect to FIG. 4).

At block 356, the system generates, locally at the in-vehicle computing device, one or more candidate suggestions that are personalized to the given user for the given suggestion state. Put another way, not only are the one or more candidate suggestions tailored to the given user of the vehicle, but the one or more candidate suggestions are also tailored to a specific contextual scenario. Generating the one or more candidate suggestions is described in more detail herein (e.g., with respect to FIG. 5).

At block 358, the system stores, in on-device storage of the in-vehicle computing device, the one or more candidate suggestions in association with the given suggestion state. For example, the system can store the one or more candidate suggestions in association with the given suggestion state in memory of the in-vehicle computing device, a hard drive operatively coupled to the in-vehicle computing device, and/or any other storage that is accessible to the in-vehicle computing device. Accordingly, in response to detecting a subsequent occurrence of the given suggestion state, the system can quickly and efficiently obtain the one or more candidate suggestions as described below (e.g., with respect to block 364).

Figure 6A:
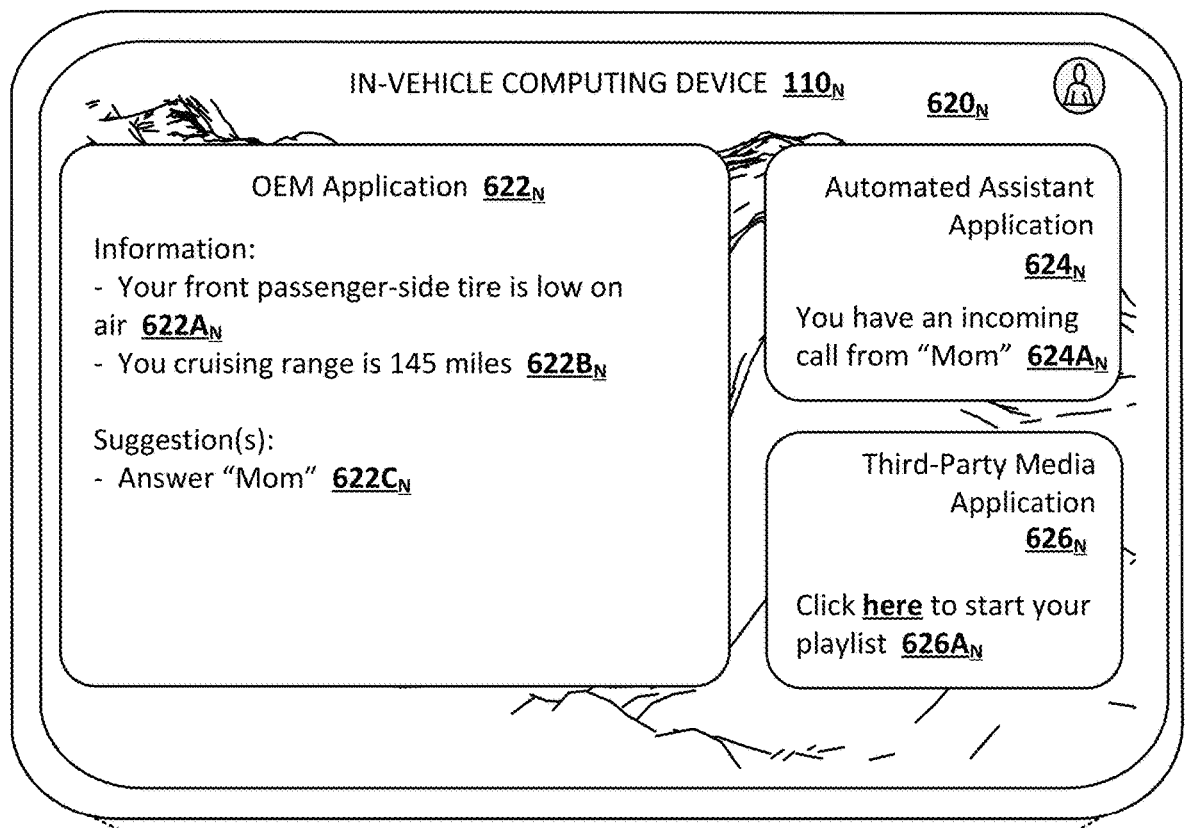
FIG. 6A and FIG. 6B depict various non-limiting examples of a display of an in-vehicle computing device providing suggestions, that are generated locally at the in-vehicle computing device, for presentation to a given user, in accordance with various implementations.
Figure 6A:
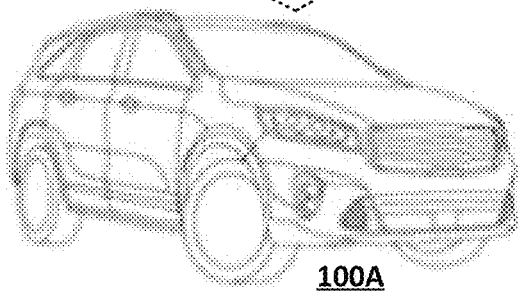
Figure 6B:
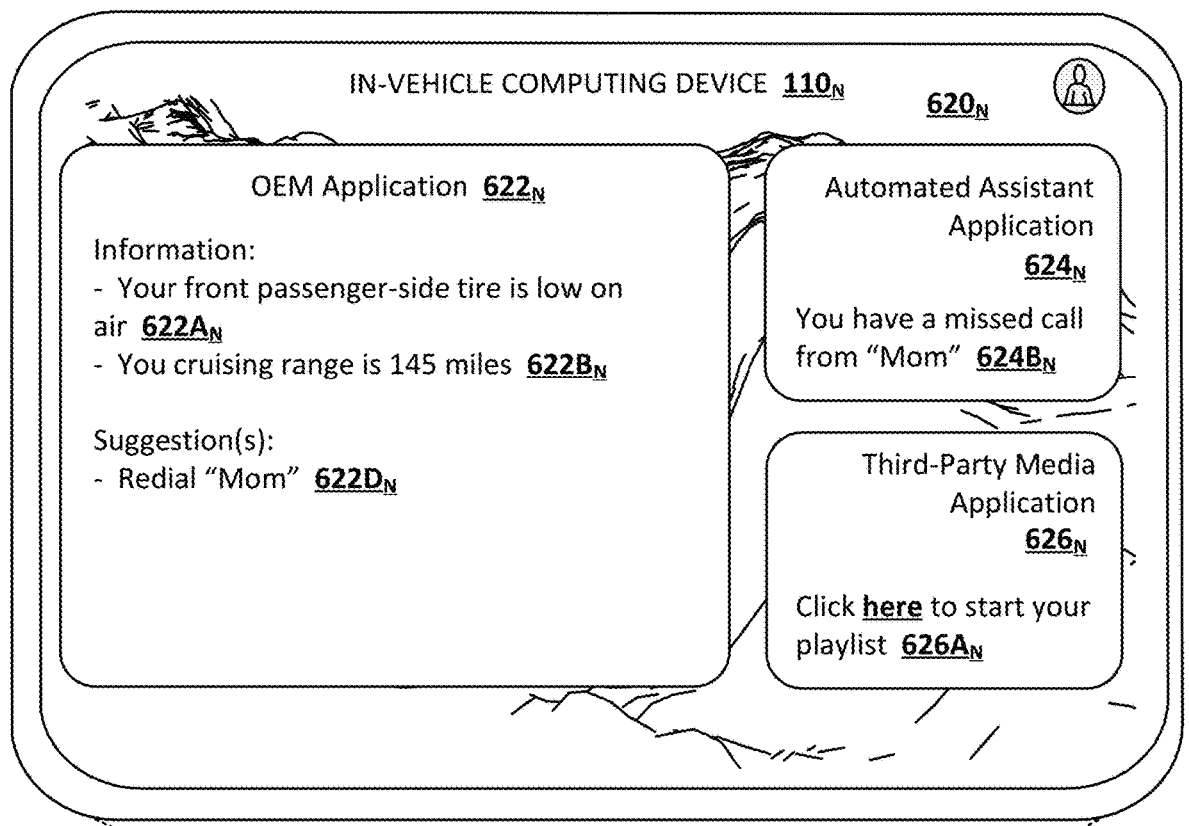
Figure 6B:
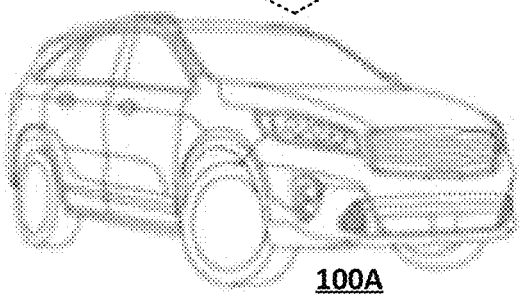

At block 360, the system causes a given candidate suggestion, from among the one or more candidate suggestions, to be provided for presentation to the given user via the in-vehicle computing device. In some implementations, the system can rank the one or more candidate suggestions, and select the given candidate suggestion based on the ranking. In these implementations, the system can utilize one or more ranking machine learning (ML) models and/or one or more ranking criteria. The one or more ranking ML models can include, for example, a global ranking ML model (e.g., that is not personalized to the given user) that can process the one or more candidate suggestions (and optionally an indication of the given suggestion state and/or the one or more contextual signals associated therewith) to rank the one or more candidate suggestions. The one or more ranking ML models can additionally, or alternatively, include, for example, a personalized ranking ML model (e.g., that is personalized to the given user) that can process the one or more candidate suggestions (and optionally an indication of the given suggestion state and/or the one or more contextual signals associated therewith) to rank the one or more candidate suggestions. In these implementations, the ML architecture of the global ranking ML model and the personalized ranking ML model may be the same or substantially similar, but may be trained based on different corpora of training data (e.g., a corpus of training data from a plurality of user vs. a corpus of training data from the given user). As a result, weights of the global ranking ML model and the personalized ranking ML model may differ and a ranking of the one or more candidate suggestions generated across these ranking ML models may differ. In some implementations, the given candidate suggestion can be visually rendered for presentation to the given user via a display of the in-vehicle computing device (e.g., as shown in FIGS. 6A and 6B). In additional or alternative implementations, the given candidate suggestion can be audibly rendered for presentation to the given user via one or more speakers of the in-vehicle computing device. The system can, in response to detecting a selection of the given candidate suggestion, cause one or more actions to be performed via the in-vehicle computing device and/or via an additional computing device that is communicatively coupled to the in-vehicle computing device (e.g., a mobile computing device of the given user).

At block 362, the system determines whether there is a subsequent occurrence of the given suggestion state. The system may determine whether there is a subsequent occurrence of the given suggestion state in the same or substantially similar manner described above with respect to block 352 of the method 300 of FIG. 3. If, at an iteration of block 362, the system determines there is a subsequent occurrence of the given suggestion state, then the system proceeds to block 364. At block 364, the system obtains, from the on-device storage of the in-vehicle computing device, the one or more candidate suggestions stored in association with the given suggestion state. At block 366, the system causes an additional candidate suggestion, from among the one or more candidate suggestions, to be provided for presentation to the given user via the in-vehicle computing device. The system may cause the additional candidate suggestion to be provided for presentation to the user in the same or substantially similar manner described above with respect to block 360 of the method 300 of FIG. 3, but with respect to the additional candidate suggestion. Notably, in some implementations, the additional candidate suggestion can be the same suggestion as the given candidate suggestion, whereas in other implementations, the additional candidate suggestion may be a different one of the one or more candidate suggestions stored in association with the given suggestion state.

If, at an iteration of block 362, the system determines there is not a subsequent occurrence of the given suggestion state, then the system proceeds to block 368. At block 368, the system determines whether there is an occurrence of an additional suggestion state for providing suggestions for presentation to a given user. The given suggestion state may be another one of the plurality of disparate suggestion states. The system may determine whether there is an occurrence of the additional suggestion state in the same or substantially similar manner described above with respect to block 352 of the method 300 of FIG. 3. If, at an iteration of block 368, the system determines there is not an occurrence of the additional suggestion state, then the system returns to block 362. If, at an iteration of block 368, the system determines there is an occurrence of the additional suggestion state, then the system returns to block 354 to identify the additional suggestion state and perform an additional iteration of the method 300 of FIG. 3 with respect to the additional suggestion state. Notably, in various implementations, there may be some temporal difference between the occurrence of the given suggested state detected at block 352 and any subsequent occurrence of the given suggestion state. Accordingly, the system may additionally monitor for occurrences of additional suggestion states. As the system detects the additional suggestion states, the system can generate one or more corresponding candidate suggestions for each of the respective additional suggestion states and store the one or more corresponding candidate suggestions and the corresponding additional suggestion states in the on-device storage of the in-vehicle computing device. As a result, the system can obtain the one or more corresponding candidate suggestions each time that occurrences of any of the suggestion states are identified to quickly and efficiently provide contextually relevant suggestions for presentation to the given user.

Figure 4:
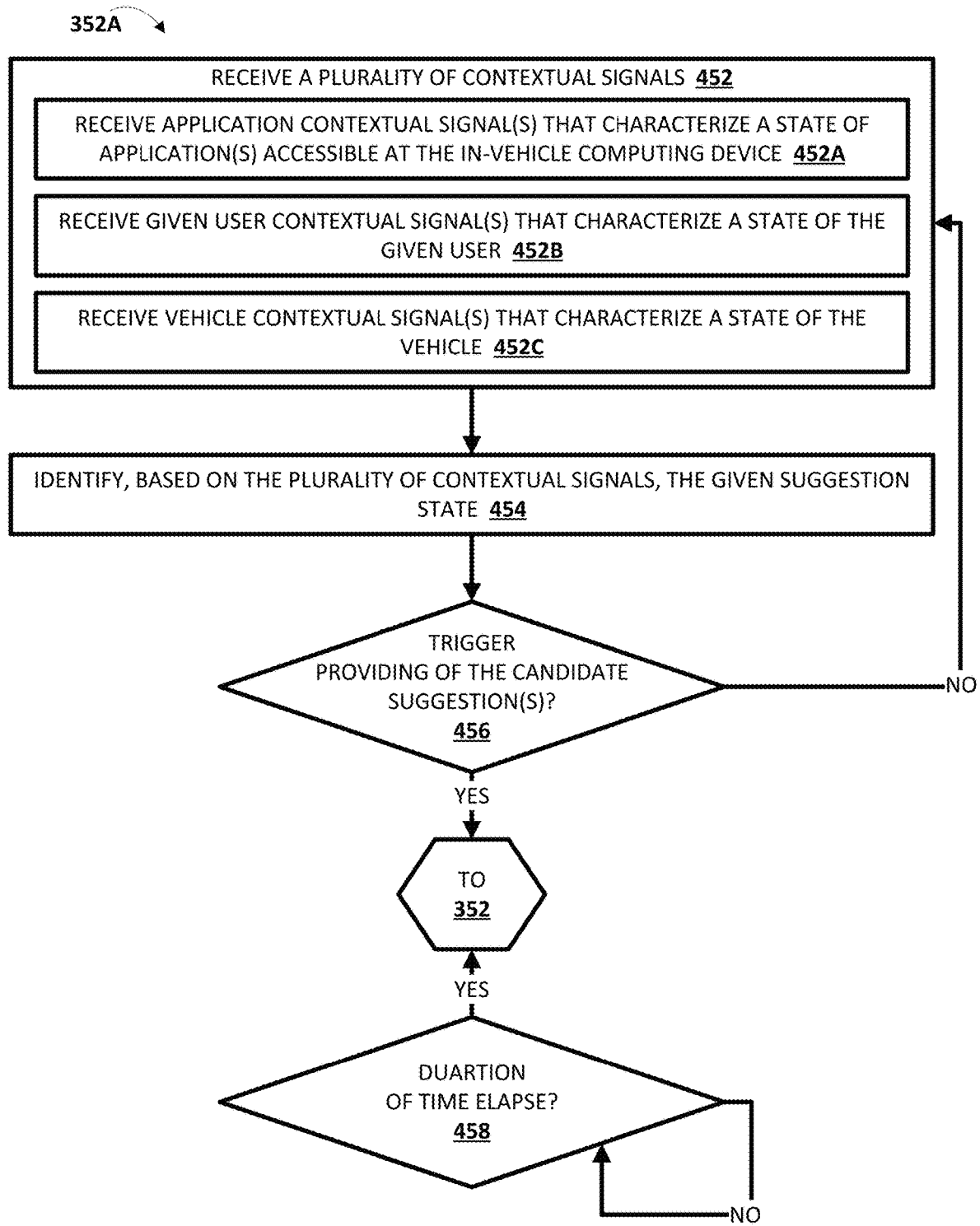
FIG. 4 depicts a flowchart illustrating an example method of identifying suggestions states for generating suggestions locally at an in-vehicle computing device from FIG. 3, in accordance with various implementations.

Turning now to FIG. 4, a flowchart illustrating an example method 352A of identifying suggestions states for generating suggestions locally at an in-vehicle computing device from FIG. 3 is depicted. For convenience, the operations of the method 352A are described with reference to a system that performs the operations. This system of the method 352A includes at least one processor, at least one memory, and/or other component(s) of computing device(s) (e.g., computing device(s) $110_{1-N}$ of FIG. 1, suggestion system 120 of FIG. 1, computing device 710 of FIG. 7, remote server(s), and/or other computing devices). While operations of the method 352A are shown in a particular order, this is not meant to be limiting. One or more operations may be reordered, omitted, and/or added.

In some implementations, at block 452, the system receives a plurality of contextual signals. For example, and as indicated at block 452A, the system may receive one or more application contextual signals that characterize a state of one or more applications accessible at the in-vehicle computing device. The one or more application contextual signals that characterize the state of the one or more applications can be based on application data associated with each of the one or more applications, including first-party data from one or more first-party applications, third-party data from one or more third-party applications, and original equipment manufacturer (OEM) data from one or more OEM applications. Further, the state of the one or more applications determined based on the one or more application contextual signals can include, for example, whether there is a notification or alert associated with a given one of the applications, such as an incoming electronic communication associated with a telephone application, a messaging application, etc., a maintenance alert associated with an OEM application of an OEM of the vehicle, and so on, whether the given user typically interacts with a given one of the applications when the user is in the vehicle, whether a given one of the applications is operating in a foreground or background of the in-vehicle computing device, and/or any other states of the one or more applications determined based on the one or more application signals.

Also, for example, and as indicated at block 452B, the system may additionally, or alternatively, receive one or more given user contextual signals that characterize a state of the given user. The one or more given user contextual signals that characterize the state of the given user can be based on user profile data of a user profile of the given user, sensor data instances of sensor data generated by one or more sensors of the vehicle, sensor data instances of sensor data generated by one or more sensors of another computing devices of the given user (e.g., a mobile computing device of the given user), application data of one or more applications utilized by the given user, and/or any other given user contextual signals that characterize the state of the given user. Further, the state of the given user determined based on the one or more given user contextual signals can include, for example, whether the given user is a driver or passenger of the vehicle, an origin location of the given user, a destination location of the given user, a user engagement level of the given user with respect to the vehicle, a route that the user is predicted to follow from the origin location to the destination location, and/or any other states of the given user determined based on the one or more given user contextual signals.

Also, for example, and as indicated at block 452C, the system may additionally, or alternatively, receive one or more vehicle contextual signals that characterize a state of the vehicle. The one or more vehicle contextual signals that characterize the state of the vehicle can be based on sensor data instances of sensor data generated by one or more sensors of the vehicle. Further, the state of the vehicle determined based on the one or more vehicle contextual signals can include, for example, the vehicle being powered to an "on" state, whether the vehicle is moving, whether the vehicle is stopped, whether the vehicle is parked, whether the vehicle is following a particular route, whether the vehicle includes additional occupants that are in addition to the given user of the vehicle, information associated with operation of the vehicle, such as how much of an energy source (e.g., gas, battery, etc.) is available to the vehicle, whether any dashboard indicators are illuminated, and/or any other states of the vehicle determined based on the one or more vehicle contextual signals. Notably, in various implementations, one or more of these various contextual signals may overlap.

In these implementations, at block 454, the system identifies, based on the plurality of contextual signals, the given suggestion state. As noted above with respect to block 352 of the method 300 of FIG. 3, the given suggestion state can represent a contextual scenario that can be defined with varying degrees of granularity based on different contextual signals that are available to the system, such as the plurality of contextual signals received at block 452. For example, assume that an incoming phone call from a contact entry of "Mom" is received via the in-vehicle computing device or an additional computing device communicatively coupled to the in-vehicle computing device, such as a mobile computing device of the given user. The given suggestion state can be defined broadly as an incoming electronic communication suggestion state identified based on incoming phone call for being an electronic communication or more narrowly as an incoming phone call suggestion state identified based specifically on the incoming phone call. In this example, the broader incoming electronic communication suggestion state can also be identified based on incoming text message data from a text messaging application, incoming email data from an email application, and/or other data that is indicative of an incoming electronic communication. However, the more narrow incoming phone call suggestion state may not be identified based on the incoming text message data from the text messaging application or the incoming email data from the email application as described above. Even further, the given suggestion state can be defined even more narrowly as an incoming phone call from "Mom" suggestion state based on the incoming phone call from the contact entry of "Mom". Accordingly, the given suggestion state can be identified based on these contextual signals and with varying degrees of granularity. In various implementations, the system may identify a more narrowly defined suggestion state (e.g., the incoming phone call from "Mom" suggestion state) if available, as opposed to a more broadly defined suggestion state (e.g., the incoming electronic communication suggestion state), to ensure the suggestions are more tailored to the given user.

In these implementations, at block 456, the system determines whether to trigger providing of the one or more candidate suggestions based on the identified suggestion state. The system can determine whether to trigger providing of the one or more candidate suggestions based on the identified suggestion state in response to an initial occurrence of the given suggestion state. Otherwise, the system can obtain the one or more candidate suggestions from the on-device storage of the in-vehicle computing device as described with respect to block 364 of the method 300 of FIG. 3. In various implementations, the system may trigger providing one or more additional candidate suggestions based on the identified suggestion state in response to a subsequent occurrence of the given suggestion state to update the one or more candidate suggestions stored in association with the given suggestion state. For example, in response to determining that the one or more candidate suggestions have been stored in association with the given suggestion state for a threshold duration of time (e.g., one month), a threshold quantity of occurrences detected (e.g., 50 occurrences detected), and/or other signals, the system may trigger providing of one or more additional candidate suggestions to ensure the one or more candidate suggestions are not stale suggestions. In various implementations, whether the given user selected any of the one or more candidate suggestions that are presented to the user can additionally, or alternatively, be utilized as a signal in determining whether the one or more candidate suggestions are stale suggestions. For instance, if a given candidate suggestion is presented to the given user multiple times, but the given user does not select the given candidate suggestion any of the multiple times, then the given candidate suggestion may be considered a stale suggestion and this may be utilized as a signal to trigger providing of the one or more additional candidate suggestions based on the identified suggestion state.

If, at an iteration of block 456, the system determines not to trigger providing of the one or more candidate suggestions, then the system returns to block 452 to receive a plurality of additional contextual signals. The system may continue performing iterations of blocks 454-456 to determine whether to trigger providing of the one or more candidate suggestions. If, at an iteration of block 456, the system determines to trigger providing of the one or more candidate suggestions, then the system proceeds to block 352 of the method 300 of FIG. 3 along with an indication that the occurrence of the given suggestion state was detected. Put another way, the system of the method 300 of FIG. 3 can perform one or more iterations of the method 352A at block 352 of the method 300 of FIG. 3 to determine whether there is an occurrence of the given suggestion state or any additional suggestion state for providing of the suggestions for presentation to the given user of the vehicle.

In additional or alternative implementations, at block 458, the system determines whether a duration of time has elapsed. The duration of time can be, for example, a regular interval of time at which the one or more candidate suggestions are to be provided for presentation to the given user. In these implementations, the given suggestion state or any additional suggestion state can be identified based on a plurality of contextual signals (e.g., as described with respect to block 454), but the system can utilize the duration of time elapsing as the signal to trigger providing of the suggestions based on the given suggestion state or additional suggestion state detected when the duration of time elapses. In various implementations, the duration of time can be defined by an OEM of the vehicle. If, at an iteration of block 458, the system determines that the duration of time has not elapsed, then the system continues monitoring for the elapsing of the duration of time at block 458. If, at an iteration of block 458, the system determines that the duration of time has elapsed, then the system proceeds to block 352 of the method 300 of FIG. 3 along with an indication that the occurrence of the given suggestion state was detected.

Notably, the contextual suggestion states (e.g., described with respect to blocks 452-456) and/or the periodic suggestion states (e.g., described with respect to block 458) can be utilized as separate, distinct techniques for determining whether to trigger providing of the one or more candidate suggestions for presentation to the user as described with respect to the method 352A of FIG. 4 that may vary from OEM to OEM. However, it should be understood that a combination of these techniques can be additionally, or alternatively, utilized to trigger providing of the suggestions via detecting an occurrence of the given suggestion state and/or the given suggestion state being detected when the duration of time elapses.

Figure 5:
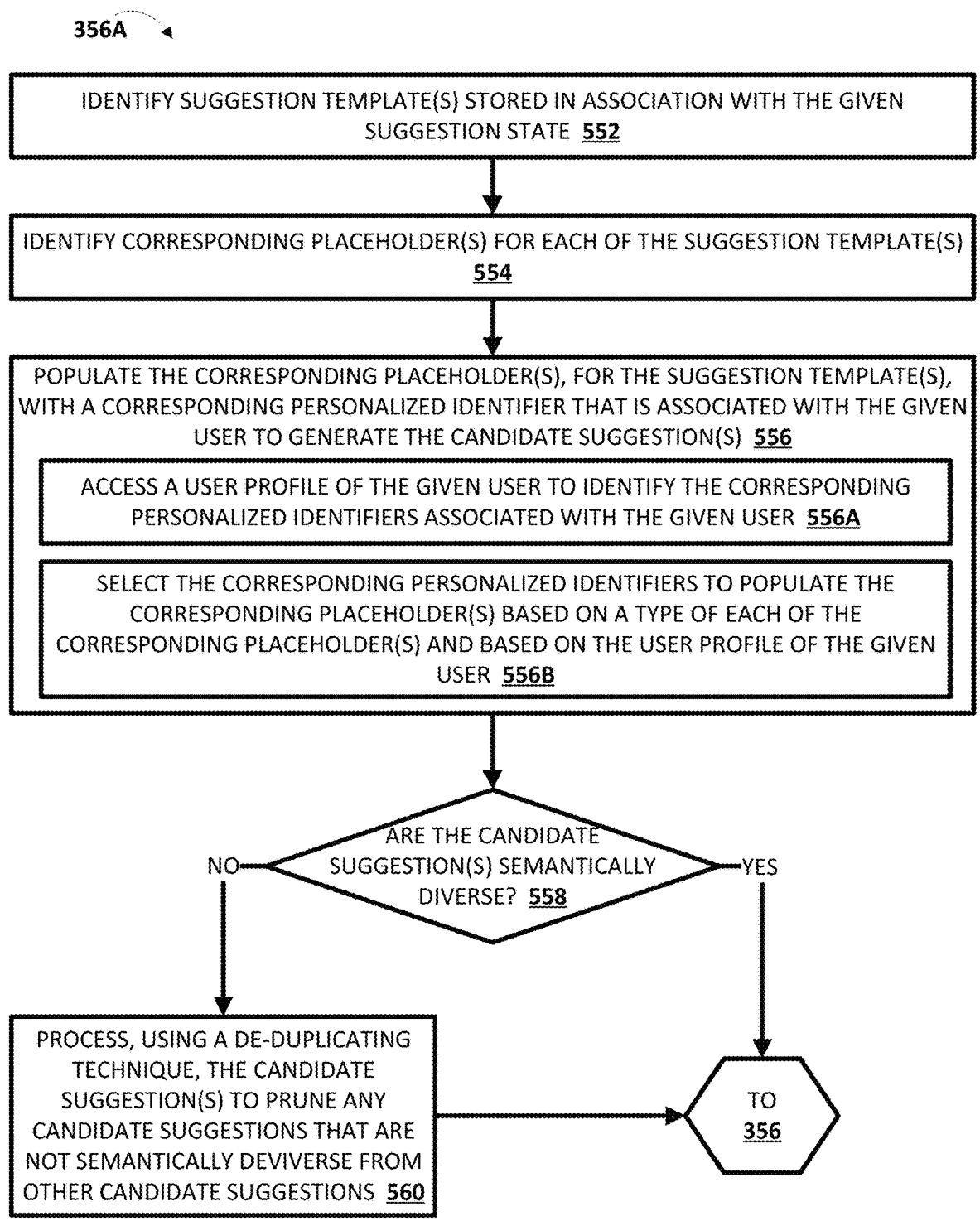
FIG. 5 depicts a flowchart illustrating an example method of using suggestion templates for generating suggestions locally at an in-vehicle computing device from FIG. 3, in accordance with various implementations.

Turning now to FIG. 5, a flowchart illustrating an example method 356A of using suggestion templates for generating suggestions locally at an in-vehicle computing device from FIG. 3 is depicted. For convenience, the operations of the method 356A are described with reference to a system that performs the operations. This system of the method 356A includes at least one processor, at least one memory, and/or other component(s) of computing device(s) (e.g., computing device(s) 110$_{1-N}$ of FIG. 1, suggestion system 120 of FIG. 1, computing device 710 of FIG. 7, remote server(s), and/or other computing devices). While operations of the method 3526 are shown in a particular order, this is not meant to be limiting. One or more operations may be reordered, omitted, and/or added.

At block 552, the system identifies one or more suggestion templates stored in association with the given suggestion state. At block 554, the system identifies one or more corresponding placeholders for each of the one or more suggestion templates. At block 556, the system populates the one or more corresponding placeholders, for one or more of the suggestion templates, with a corresponding personalized identifier that is associated with the given user to generate the one or more candidate suggestions. For example, and as indicated at block 556A, the system may access a user profile of the given user to identify the corresponding personalized identifiers associated with the given user. Also, for example, and as indicated at block 556B, the system may select the corresponding personalized identifiers to populate one or more of the corresponding placeholders based on a type of each of the one or more corresponding placeholders and based on the user profile of the given user. The one or more suggestion templates can be utilized in generating the one or more candidate suggestions. Further, the one or more suggestion templates can be indexed according to a semantic identifier of various suggestion states. Moreover, each of the one or more suggestion templates can include one or more corresponding placeholders that can be populated with information that is personal to the given user, thereby personalizing the one or more candidate suggestions.

For example, again assume that an incoming phone call from a contact entry of "Mom" is received via the in-vehicle computing device or an additional computing device communicatively coupled to the in-vehicle computing device, such as a mobile computing device of the given user. As described above with respect to FIG. 4, the given suggestion state in this example can be, in some instances, an incoming electronic communication suggestion state, an incoming phone call suggestion state, or an incoming phone call from "Mom" suggestion state. In this example, the incoming electronic communication suggestion state can be associated with suggestion templates of "Contact [CONTACT ENTRY]", "Message [CONTACT ENTRY]", or the like. Further, the incoming phone call suggestion state can be associated with suggestion templates of "Call [CONTACT ENTRY] back", "Redial [CONTACT ENTRY]", or the like. Moreover, the incoming phone call from "Mom" suggestion state can be associated with suggestion templates of "Call Mom back", "Redial Mom", or the like. Notably, the suggestion templates associated with the incoming phone call from "Mom" suggestion state are specific to the contact entry "Mom" and may not be available upon detecting an occurrence of the incoming phone from "Mom" suggestion state, but may be available upon detecting subsequent occurrences of the incoming phone from "Mom" suggestion state and/or if these suggestion templates are manually defined by the given user or a developer.

In this example, the one or more corresponding placeholders for each of the suggestion templates corresponds to [CONTACT ENTRY]. Accordingly, the corresponding placeholders need to be populated with corresponding personalized identifiers to personalize the one or more candidate suggestions for the given user and for the given suggestion state. As a result, the system can access a user profile of the given user to identify the corresponding personalized identifiers from, for instance, a contacts list of the given user that is a part of the user profile, and can select a contact entry of "Mom" from the contacts list as the personalized identifier. Notably, in this example, the system can determine a type of the corresponding placeholders (e.g., a [CONTACT ENTRY] type). Accordingly, the system can restrict a search space of the user profile to only contact entries of one or more contact lists of the given user, such as email contact entries, phone number contact entries, etc. The system can utilize the contact entry of "Mom" to populate the aforementioned suggestion templates to generate the one or more candidate suggestions.

At block 558, the system determines whether the one or more candidate suggestions are semantically diverse. The system can determine whether the one or more candidate suggestions are semantically diverse using any known technique. For example, the system can compare an edit distance between each of the one or more candidate suggestions, and determine that the one or more candidate suggestions are semantically diverse in response to an edit distance between the one or more candidate suggestions satisfying a threshold. Also, for example, the system can generate a corresponding embedding or other lower-dimensional representation of the one or more candidate suggestions, map the corresponding embeddings to an embedding space that allows the one or more candidate suggestions to be compared, compare a distance between each of the one or more candidate suggestions in the embedding space, and determine that the one or more candidate suggestions are semantically diverse in response to the distance between the one or more candidate suggestions in the embedding space satisfying a threshold. Also, for example, the system can compare corresponding intents associated with the one or more suggestions, and determine that the one or more candidate suggestions are semantically diverse if they include different intents. If, at an iteration of block 558, the system determines that the one or more candidate suggestions are semantically diverse, then the system proceeds to block 356 of the method 300 of FIG. 3 along with an indication of the one or more candidate suggestions.

If, at an iteration of block 558, the system determines that the one or more candidate suggestions are not semantically diverse, then the system proceeds to block 560. At block 560, the system processes, using a de-duplicating technique, the one or more candidate suggestions to prune any candidate suggestions that are not semantically diverse from other candidate suggestions. Accordingly, in the above example, only one of the candidate suggestions "Call Mom back" and "Redial Mom" may be considered for providing for presentation to the given user since there is no semantically meaningful difference between these candidate suggestions (e.g., both are associated with returning an incoming phone call from "Mom" that was not answered by the given user). However, in the above example, a candidate suggestion of "Message Mom" may be considered semantically diverse. The system proceeds to block 356 of the method 300 of FIG. 3 along with an indication of the one or more candidate suggestions. In various implementations, such as when the one or more candidate suggestions only include a single candidate suggestion, blocks 558 and 560 may be omitted. In these implementations, the system may proceed directly from block 556 to block 356 of the method 300 of FIG. 3 along with an indication of the single candidate suggestion.

Turning now to FIGS. 6A and 6B, various non-limiting examples of a display of an in-vehicle computing device providing suggestions are depicted. For the sake of example, assume the computing $110_N$ from FIG. 1 is an in-vehicle computing device of the vehicle 100A (e.g., referred to hereinafter as the in-vehicle computing device $110_N$). The in-vehicle computing device $110_N$ includes a display $620_N$ having a plurality of disparate portions that are dedicated to different applications. For instance, the display $620_N$ includes a first portion $622_N$ of the display $620_N$ that is dedicated to an OEM application of an OEM of the vehicle 100A executing at least in part at the in-vehicle computing device $110_N$, a second portion $624_N$ of the display $620_N$ that is dedicated to an automated assistant application of an automated assistant executing at least in part at the in-vehicle computing device $110_N$, and a third portion $626_N$ of the display $620_N$ that is dedicated to a third-party media application associated with an example music streaming service. Although the display $620_N$ of the in-vehicle computing device $110_N$ is shown in FIGS. 6A and 6B as having a particular configuration (e.g., multiple disparate portions dedicated to various applications), it should be understood that is for the sake of example and is not meant to be limiting. For instance, the display $620_N$ may be configured in any desirable manner that may be specific to unique OEMs.

Each of these disparate portions of the display $620_N$ can visually present corresponding information to the given user of the vehicle 100A. For instance, the first portion $622_N$ of the display $620_N$ that is dedicated to the OEM application can include information related to various vehicular sensors, such as first information $622A_N$ of "Your front passenger tire is low on air" and second information $622B_N$ of "Your cruising range is 145 miles" as shown in FIGS. 6A and 6B, and/or other information accessible by the OEM application. Further, the second portion $624_N$ of the display $620_N$ that is dedicated to the automated assistant application can include information related to various notifications for the given user, such as a notification $624A_N$ of "You have an incoming call from 'Mom'" in FIG. 6A or a notification $624B_N$ of "You have a missed call from 'Mom'" in FIG. 6B, and/or actions that the automated assistant can perform on behalf of the given user. Moreover, the third portion $626_N$ of the display $620_N$ that is dedicated to the third-party media application can include various media controls and/or suggestions, such as a suggestion $626A_N$ of "Click here to start your playlist" as shown in FIGS. 6A and 6B. Notably, not only does the third portion $626_N$ of the display $620_N$ that is dedicated to the third-party media application include at least one suggestion, but the first portion $622_N$ of the display $620_N$ that is dedicated to the OEM application also includes at least one suggestion that is generated in the manner described herein. In various implementations, the automated assistant application may be utilized in generating these suggestions, but provide, or donate, these suggestions to other applications (e.g., the OEM application and the third-party media application in the example of FIGS. 6A and 6B), and these other applications can provide these suggestions for presentation to the user.

Referring specifically to FIG. 6A, further assume that a given user of the vehicle 100A receives an incoming phone call from a contact entry of "Mom" as indicated by the notification $624A_N$ shown at the second portion $624_N$ of the display $620_N$ that is dedicated to the automated assistant application. The incoming phone can call be received, for example, at a mobile computing device of the given user that is communicatively coupled to the in-vehicle computing device $110_N$, thereby enabling the given user to utilize the in-vehicle computing device $110_N$ to answer the phone call via a phone application of the mobile computing device and/or otherwise interact with the mobile computing device. Additionally, or alternatively, the in-vehicle computing device $110_N$ may have a dedicated phone application. In this example, further assume that an incoming phone call suggestion state is identified as a contextual suggestion state for providing suggestions based on a state of a phone application (e.g., of the in-vehicle computing device $110_N$ and/or of the mobile computing device) indicating that there is an incoming phone call.

In this example, and in response to identifying the incoming phone call suggestion state, a request for the suggestions can be transmitted to a suggestion system (e.g., the suggestion system 120 of FIG. 1). Notably, the suggestion system can be implemented locally at the in-vehicle computing device $110_N$ and/or remotely from the in-vehicle computing device $110_N$ (e.g., at the mobile computing device and/or at remote server(s) that are communicatively coupled to the in-vehicle computing device $110_N$). Further, the suggestion system can generate one or more candidate suggestions, and cause at least one given candidate suggestion to be provided for presentation to the given user of the vehicle 100A. For instance, in the example of FIG. 6A, the suggestion system can generate at least a candidate suggestion $622C_N$ of "Answer 'Mom'" in the manner described herein (e.g., with respect to at least FIG. 3-5). Accordingly, the candidate suggestion $622C_N$ that is provided for presentation to the user is not only personalized to the suggestion state by leveraging the incoming phone call in generating the suggestion, but also personalized to the given user of the vehicle 100A by including the contact entry that initiated the incoming phone call (e.g., "Mom"). Accordingly, while the suggestion $622C_N$ is visually presented to the given user, the given user can direct user input to the suggestion $622C_N$ to cause the phone call from "Mom" to be answered.

Referring specifically to FIG. 6B, further assume that the given user of the vehicle 100A does not answer the incoming phone call as indicated by the notification 624B$_N$ shown at the second portion 624$_N$ of the display 620$_N$ that is dedicated to the automated assistant application. In this example, further assume that a missed phone call suggestion state is identified as a contextual suggestion state for providing suggestions based on the state of the phone application (e.g., of the in-vehicle computing device 110$_N$ and/or of the mobile computing device) indicating that there is a missed phone call. In this example, and in response to identifying the missed call suggestion state, another request for the suggestions can be transmitted to the suggestion system. Similarly, the suggestion system can generate one or more candidate suggestions, and cause at least one given candidate suggestion to be provided for presentation to the given user of the vehicle 100A. For instance, in the example of FIG. 6B, the suggestion system can generate at least a candidate suggestion 622D$_N$ of "Redial 'Mom'" in the manner described herein (e.g., with respect to at least FIG. 3-5). Accordingly, the candidate suggestion 622D$_N$ that is provided for presentation to the user is not only personalized to the suggestion state by leveraging the missed call in generating the suggestion, but also personalized to the given user of the vehicle 100A by including the contact entry that initiated the incoming phone call (e.g., "Mom"). Accordingly, while the suggestion 622D$_N$ is visually presented to the given user, the given user can direct user input to the suggestion 622D$_N$ to cause an outgoing phone call to "Mom" to be initiated.

Notably, a temporal difference between identifying the incoming phone call suggestion state in FIG. 6A and identifying the missed phone call suggestion state in FIG. 6B may be a relatively short duration of time such that the suggestion 622D$_N$ of FIG. 6B may be visually rendered immediately after the suggestion 622C$_N$ of FIG. 6A. Accordingly, the suggestion system can cause the suggestion 622C$_N$ of FIG. 6A to be dynamically adapted to the suggestion 622D$_N$ of FIG. 6B in a seamless manner. For instance, from the perspective of the given user of the vehicle 100A, this seamless transition may appear as if the term "Answer" in the suggestion 622C$_N$ of FIG. 6A dynamically adapts to "Redial" in the suggestion 622D$_N$ of FIG. 6B without "Mom" ever being removed from the first portion 622$_N$ of the display 620$_N$. This dynamic adaptation of the suggestions may not only improve a user experience with the suggestion system, but also reduce latency in causing the suggestion 622D$_N$ of FIG. 6B to be visually rendered for presentation to the given user and/or reduce consumption of computational resources in causing the suggestion 622D$_N$ of FIG. 6B to be visually rendered for presentation to the given user.

Although the examples of FIGS. 6A and 6B are described with respect to the suggestion states being contextual suggestion states, it should be understood that is for the sake of example and is not meant to be limiting. For instance, the techniques for generating suggestions described herein can also additionally, or alternatively, be utilized in generating suggestions for periodic suggestion states. In these instances, suggestion states can be identified at periodic intervals of time (e.g., upon startup of the vehicle and every two minutes thereafter), and suggestions for those suggestion states can be personalized to the user and provided for presentation. Notably, the OEM of the vehicle 100A may be able to define whether to employ contextual suggestion states for generating suggestions, periodic suggestion states for generating the suggestions, or both.

Further, although the example of FIGS. 6A and 6B are described with respect to particular contextual suggestion states (e.g., the incoming phone call suggestion state and the missed phone call suggestion state), it should be understood that is for the sake of example and is not meant to be limiting. For instance, the suggestion states that may be encountered in a real-world environment may be a function of the various contextual signals that are available to the in-vehicle computing device. Nonetheless, the techniques described herein can be utilized to generate suggestions that are personalized to the given user for each of these suggestion states.

Moreover, although the examples of FIGS. 6A and 6B are described with respect to identifying a single suggestion state and causing a single suggestion for the single suggestion state to be provided for presentation to the user, it should be understood that is for the sake of brevity and is not meant to be limiting. For instance, multiple suggestions for the single suggestion state may be generated and provided for presentation to the given user at any given time instance. Also, for instance, single or multiple suggestions for multiple disparate suggestion states may be provided for presentation to the user at any given time instance. Accordingly, the techniques described herein can be utilized to generate suggestions that are personalized to the given user for each of these suggestion states at any given time instance.

Figure 7:
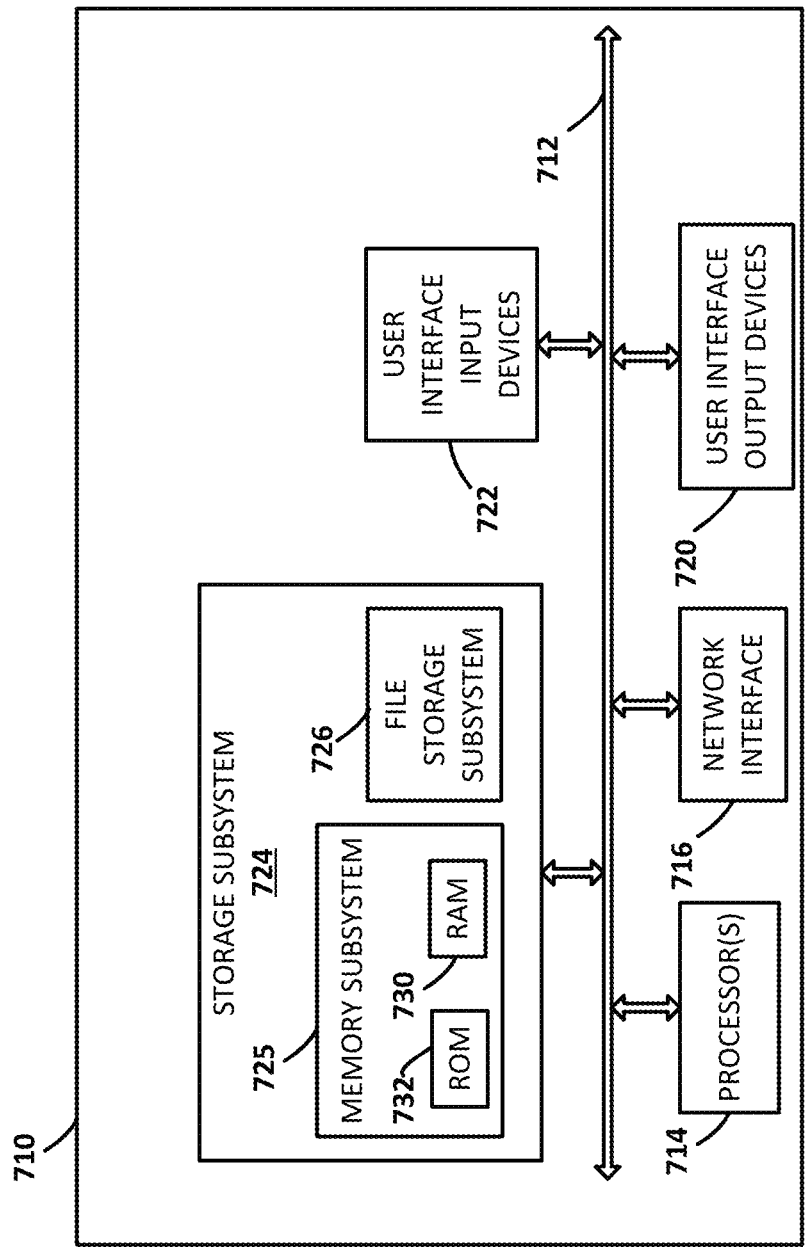
FIG. 7 depicts an example architecture of a computing device, in accordance with various implementations.

Turning now to FIG. 7, a block diagram of an example computing device 710 that may optionally be utilized to perform one or more aspects of techniques described herein is depicted. In some implementations, one or more computing devices, one or more vehicles, and/or other component(s) may comprise one or more components of the example computing device 710.

Computing device 710 typically includes at least one processor 714 which communicates with a number of peripheral devices via bus subsystem 712. These peripheral devices may include a storage subsystem 724, including, for example, a memory subsystem 725 and a file storage subsystem 726, user interface output devices 720, user interface input devices 722, and a network interface subsystem 716. The input and output devices allow user interaction with computing device 710. Network interface subsystem 716 provides an interface to outside networks and is coupled to corresponding interface devices in other computing devices.

User interface input devices 722 may include a keyboard, pointing devices such as a mouse, trackball, touchpad, or graphics tablet, a scanner, a touchscreen incorporated into the display, audio input devices such as voice recognition systems, microphones, and/or other types of input devices. In general, use of the term "input device" is intended to include all possible types of devices and ways to input information into computing device 710 or onto a communication network.

User interface output devices 720 may include a display subsystem, a printer, a fax machine, or non-visual displays such as audio output devices. The display subsystem may include a cathode ray tube (CRT), a flat-panel device such as a liquid crystal display (LCD), a projection device, or some other mechanism for creating a visible image. The display subsystem may also provide non-visual display such as via audio output devices. In general, use of the term "output device" is intended to include all possible types of devices and ways to output information from computing device 710 to the user or to another machine or computing device.

Storage subsystem 724 stores programming and data constructs that provide the functionality of some or all of the modules described herein. For example, the storage subsystem 724 may include the logic to perform selected aspects of the methods disclosed herein, as well as to implement various components depicted in FIGS. 1 and 2.

These software modules are generally executed by processor 714 alone or in combination with other processors. Memory 725 used in the storage subsystem 724 can include a number of memories including a main random-access memory (RAM) 730 for storage of instructions and data during program execution and a read only memory (ROM) 732 in which fixed instructions are stored. A file storage subsystem 726 can provide persistent storage for program and data files, and may include a hard disk drive, a floppy disk drive along with associated removable media, a CD-ROM drive, an optical drive, or removable media cartridges. The modules implementing the functionality of certain implementations may be stored by file storage subsystem 726 in the storage subsystem 724, or in other machines accessible by the processor(s) 714.

Bus subsystem 712 provides a mechanism for letting the various components and subsystems of computing device 710 communicate with each other as intended. Although bus subsystem 712 is shown schematically as a single bus, alternative implementations of the bus subsystem 712 may use multiple busses.

Computing device 710 can be of varying types including a workstation, server, computing cluster, blade server, server farm, or any other data processing system or computing device. Due to the ever-changing nature of computers and networks, the description of computing device 710 depicted in FIG. 7 is intended only as a specific example for purposes of illustrating some implementations. Many other configurations of computing device 710 are possible having more or fewer components than the computing device depicted in FIG. 7.

In situations in which the systems described herein collect or otherwise monitor personal information about users, or may make use of personal and/or monitored information), the users may be provided with an opportunity to control whether programs or features collect user information (e.g., information about a user's social network, social actions or activities, profession, a user's preferences, or a user's current geographic location), or to control whether and/or how to receive content from the content server that may be more relevant to the user. Also, certain data may be treated in one or more ways before it is stored or used, so that personal identifiable information is removed. For example, a user's identity may be treated so that no personal identifiable information can be determined for the user, or a user's geographic location may be generalized where geographic location information is obtained (such as to a city, ZIP code, or state level), so that a particular geographic location of a user cannot be determined. Thus, the user may have control over how information is collected about the user and/or used.

In some implementations, a method implemented by one or more processors is provided, and includes identifying, at an in-vehicle computing device of a vehicle of a given user, an occurrence of a given suggestion state for providing suggestions for presentation to the given user, the given suggestion state being one of a plurality of disparate suggestion states; and generating, locally at the in-vehicle computing device, one or more candidate suggestions. Each of the one or more candidate suggestions is personalized to the given user for the given suggestion state. Further, generating the one or more candidate suggestions includes identifying one or more suggestion templates stored in association with the given suggestion state; identifying one or more corresponding placeholders for each of the one or more suggestion templates; and populating each of the one or more corresponding placeholders, for each of the one or more suggestion templates, with a corresponding personalized identifier that is associated with the given user to generate the one or more candidate suggestions. The method further includes storing, in on-device storage of the in-vehicle computing device, the one or more candidate suggestions in association with the given suggestion state; and causing, in response to identifying the occurrence of the given suggestion state, a given candidate suggestion, from among the one or more candidate suggestions, to be provided for presentation to the given user via the in-vehicle computing device.

These and other implementations of technology disclosed herein can optionally include one or more of the following features.

In some implementations, the given suggestion state may be a contextual suggestion state, and the occurrence of the given suggestion state may be identified in response to detecting one or more contextual signals that trigger generating the one or more candidate suggestions for the given user and for the given suggestion state.

In some versions of those implementations, the one or more contextual signals may include one or more application contextual signals that characterize a state of a given software application accessible at the in-vehicle computing device of the vehicle of the given user, and the state of the given software application may include one or more of: an electronic communication being received by the given software application, a proactive notification associated with the given software application to be provided for presentation to the given user, or a reactive notification associated with the given software application to be provided for presentation to the given user.

In additional or alternative versions of those implementations, the one or more contextual signals may include one or more given user contextual signals that characterize a state of the given user of the vehicle, and the state of the given user may include one or more of: whether the given user is driving the vehicle, whether the given user is a passenger of the vehicle, an engagement level of the given user while the given user is located in the vehicle, an origin location of the given user, or a destination location of the given user.

In additional or alternative versions of those implementations, the one or more contextual signals may include one or more vehicle contextual signals that characterize a state of the vehicle of the given user, and the state of the vehicle may include one or more of: the vehicle being powered on, the vehicle moving, the vehicle stopping, the vehicle being parked, the vehicle following a particular route from an origin location to a destination location, or the vehicle including additional occupants beyond the given user.

In additional or alternative implementations, the given suggestion state may be a periodic suggestion state, and the occurrence of the given suggestion state may be identified based on duration of time elapsing that triggers generating the one or more candidate suggestions for the given user and for the given suggestion state. In some versions of those implementations, the duration of time may be provided by an original equipment manufacturer (OEM) of the vehicle of the given user.

In some implementations, populating the one or more corresponding placeholders with the corresponding personalized identifier that is associated with the given user may include: accessing a user profile of the given user, stored locally in the on-device storage of the in-vehicle computing device, to identify the corresponding personalized identifiers associated with the given user; and selecting the corresponding personalized identifiers to populate each of the one or more corresponding placeholders based on a type of each of the one or more corresponding placeholders and based on the user profile of the given user. In some versions of those implementations, the corresponding personalized identifier that is associated with the given user may include one or more of: a contact entry identifier associated with a contact entry of the given user, a media identifier associated with media of interest to the given user, a home automation device identifier of a home automation device associated with the given user, or a software application identifier of a software application accessible by the in-vehicle computing device.

In some implementations, the method may further include receiving, from the given user and via the in-vehicle computing device, user input directed to the given candidate suggestion; and in response to receiving the user input directed to the given candidate suggestion: causing the in-vehicle computing device or an additional computing device, that is communicatively coupled to the in-vehicle computing device, to perform one or more corresponding actions associated with the given candidate suggestion. In some versions of those implementations, fulfillment data associated with each of the one or more corresponding actions may be pre-cached in the on-device storage of the in-vehicle computing device. In additional or alternative versions of those implementations, the method may further include, in response to receiving the user input directed to the given candidate suggestion: utilizing the user input directed to the given candidate suggestion as a feedback signal to update a ranking of the one or more candidate suggestions.

In some implementations, the method may further include, prior to causing the given candidate suggestion to be provided for presentation to the given user via the in-vehicle computing device: processing, using one or more ranking machine learning (ML) models, the one or more candidate suggestions to rank the one or more candidate suggestions; and selecting, based on the ranking, the given candidate suggestion to be provided for presentation to the given user via the in-vehicle computing device. In some versions of those implementations, the one or more ranking ML models may include one or more of: a global ranking ML model that is not personalized to the given user, or a personalized ranking ML model that is personalized to the given user.

In some implementations, the method may further include identifying a latency measure associated with causing the given candidate suggestion to be provided for presentation to the given user via the in-vehicle computing device; and utilizing the latency measure to modify a quantity of the one or more candidate suggestions that are stored in association with the given suggestion state or one or more additional suggestion states.

In some implementations, the method may further include identifying, at the in-vehicle computing device, a subsequent occurrence of the given suggestion state; obtaining, from the on-device storage of the in-vehicle computing device, the one or more candidate suggestions stored in association with the given suggestion state; and causing, in response to identifying the subsequent occurrence of the given suggestion state, an additional given candidate suggestion, from among the one or more candidate suggestions, to be provided for presentation to the given user via the in-vehicle computing device, the additional given candidate suggestion being the same as the given candidate suggestion or another one of the one or more candidate suggestions. In some versions of those implementations, the additional given candidate suggestion may be another one of the one or more candidate suggestions, and causing the additional given candidate suggestion to be provided for presentation to the user may include dynamically adapting a given candidate suggestion interface element, that is associated with the given candidate suggestion, to be provided for presentation to the user via a display of the in-vehicle computing device with an additional given candidate suggestion interface element, that is associated with the additional given candidate suggestion.

In some implementations, the method may further include, prior storing the one or more candidate suggestions in association with the given suggestion state in the storage accessible by the in-vehicle computing device: processing, using a de-duplicating technique, the one or more candidate suggestions to prune any candidate suggestions, of the one or more candidate suggestions, that are not semantically diverse from the other candidate suggestions, of the one or more candidate suggestions.

In some implementations, the method may further include identifying, at the in-vehicle computing device, an occurrence of an additional suggestion state for providing suggestions for presentation to the given user, the additional suggestion state being one of the plurality of disparate suggestion states that is in addition to the given suggestion state; and generating, locally at the in-vehicle computing device, one or more additional candidate suggestions. Each of the one or more additional candidate suggestions is personalized to the given user for the additional suggestion state. Further, generating the one or more additional candidate suggestions includes identifying one or more additional suggestion templates stored in association with the additional suggestion state; identifying one or more corresponding additional placeholders for each of the one or more additional suggestion templates; and populating each of the one or more corresponding additional placeholders, for each of the one or more additional suggestion templates, with the corresponding personalized identifier that is associated with the given user to generate the one or more additional suggestions. The method may further include storing, in the on-device storage of the in-vehicle computing device, the one or more additional suggestions in association with the additional suggestion state; and causing, in response to identifying the occurrence of the additional suggestion state, an additional candidate suggestion, from among the one or more additional candidate suggestions, to be provided for presentation to the given user via the in-vehicle computing device.

In some implementations, causing the given candidate suggestion to be provided for presentation to the given user via the in-vehicle computing device may include causing an indication of the given candidate suggestion to be visually rendered for presentation to the given user via a display of the in-vehicle computing device. In additional or alternative implementations, causing the given candidate suggestion to be provided for presentation to the given user the in-vehicle computing device may include causing an indication of the given candidate suggestion to be audibly rendered for presentation to the given user via one or more speakers of the in-vehicle computing device.

In some implementations, a method implemented by one or more processors is provided, and includes identifying, at an in-vehicle computing device of a vehicle of a given user, an occurrence of a given suggestion state for providing suggestions for presentation to the given user, the given suggestion state being one of a plurality of disparate suggestion states; and generating, locally at the in-vehicle computing device, one or more candidate suggestions. Each of the one or more candidate suggestions is personalized to the given user for the given suggestion state. The method further includes storing, in on-device storage of the in-vehicle computing device, the one or more candidate suggestions in association with the given suggestion state; and causing, in response to identifying the occurrence of the given suggestion state, a given candidate suggestion, from among the one or more candidate suggestions, to be provided for presentation to the given user via the in-vehicle computing device. Causing the given candidate suggestion to be provided for presentation to the given user via the in-vehicle computing device includes causing a given candidate suggestion interface element, that is associated with the given candidate suggestion, to be provided for presentation to the user via a display of the in-vehicle computing device. The method further includes, in response to determining that the given user has not provided user input directed to the given candidate suggestion interface element and in response to determining that a threshold duration of time has elapsed since causing the given candidate suggestion to be provided for presentation to the given user via the in-vehicle computing device: causing an additional candidate suggestion, from among the one or more candidate suggestions, to be provided for presentation to the given user via the in-vehicle computing device. The additional candidate suggestion is in addition to the given candidate suggestion. Further, causing the additional candidate suggestion to be provided for presentation to the given user via the in-vehicle computing device includes causing the given candidate suggestion interface element, that is associated with the given candidate suggestion, to be dynamically adapted with an additional candidate suggestion interface element, that is associated with the additional candidate suggestion.

These and other implementations of technology disclosed herein can optionally include one or more of the following features.

In some implementations, the method may further include in response to determining that the given user has not provided the user input directed to the given candidate suggestion interface element and in response to determining that the threshold duration of time has not elapsed since causing the given candidate suggestion to be provided for presentation to the given user via the in-vehicle computing device: causing the given candidate suggestion interface element, that is associated with the given candidate suggestion, to persist at the display of the in-vehicle computing device.

In some implementations, the method may further include, in response to determining that the given user has provided the user input directed to the given candidate suggestion interface element: causing the in-vehicle computing device or an additional computing device, that is communicatively coupled to the in-vehicle computing device, to perform one or more corresponding actions associated with the given candidate suggestion.

In some implementations, the threshold duration of time may be based on a type of the given suggestion state. In some versions of those implementations, the type of the given suggestion state may be one of: a given software application contextual suggestion state, a vehicle contextual suggestion state, a given user contextual suggestion state, or a periodic suggestion state.

In addition, some implementations include one or more processors (e.g., central processing unit(s) (CPU(s)), graphics processing unit(s) (GPU(s)), and/or tensor processing unit(s) (TPU(s))) of one or more computing devices, where the one or more processors are operable to execute instructions stored in associated memory, and where the instructions are configured to cause performance of any of the aforementioned methods. Some implementations also include one or more non-transitory computer readable storage media storing computer instructions executable by one or more processors to perform any of the aforementioned methods. Some implementations also include a computer program product including instructions executable by one or more processors to perform any of the aforementioned methods.

It should be appreciated that all combinations of the foregoing concepts and additional concepts described in greater detail herein are contemplated as being part of the subject matter disclosed herein. For example, all combinations of claimed subject matter appearing at the end of this disclosure are contemplated as being part of the subject matter disclosed herein.

What is claimed is:

1. A method implemented by one or more processors, the method comprising:
   identifying, at an in-vehicle computing device of a vehicle of a given user, an occurrence of a given suggestion state for providing suggestions for presentation to the given user,
      wherein the occurrence of the given suggestion state is identified in response to detecting one or more contextual signals that trigger generating one or more candidate suggestions for the given user,
      wherein the one or more contextual signals include one or more application contextual signals that characterize a state of a given software application accessible at the in-vehicle computing device of the vehicle of the given user, and
      wherein the state of the given software application includes one or more of: an electronic communication being received by the given software application, a proactive notification associated with the given software application to be provided for presentation to the given user, or a reactive notification associated with the given software application to be provided for presentation to the given user;
   in response to identifying the occurrence of the given suggestion state:
      generating, locally at the in-vehicle computing device, one or more candidate suggestions, wherein each of the one or more candidate suggestions is personalized to the given user for the given suggestion state, and wherein generating the one or more candidate suggestions comprises:
         identifying one or more suggestion templates stored in association with the given suggestion state;
         identifying one or more corresponding placeholders for each of the one or more suggestion templates; and
         populating each of the one or more corresponding placeholders, for each of the one or more suggestion templates, with a corresponding personalized identifier that is associated with the given user to generate the one or more candidate suggestions; and causing a given candidate suggestion, from among the one or more candidate suggestions, to be provided for presentation to the given user via the in-vehicle computing device;

storing, in on-device storage of the in-vehicle computing device, the one or more candidate suggestions in association with the given suggestion state;

identifying, at the in-vehicle computing device of the vehicle of the given user, a subsequent occurrence of the given suggestion state; and in response to identifying the subsequent occurrence of the given suggestion state:
causing the given candidate suggestion, from among the one or more candidate suggestions, to be provided for presentation to the given user via the in-vehicle computing device.

2. The method of claim 1, further comprising:
subsequent to generating the one or more candidate suggestions for the given suggestion state:
determining that a duration of time has elapsed since the one or more candidate suggestions were generated; and
in response to determining that the duration of time has elapsed since the one or more candidate suggestions were generated:
re-generating, locally at the in-vehicle computing device, the one or more candidate suggestions for the given suggestion state.

3. The method of claim 2, wherein the duration of time is provided by an original equipment manufacturer (OEM) of the vehicle of the given user.

4. The method of claim 1, wherein populating the one or more corresponding placeholders with the corresponding personalized identifier that is associated with the given user comprises:
accessing a user profile of the given user, stored locally in the on-device storage of the in-vehicle computing device, to identify the corresponding personalized identifiers associated with the given user; and
selecting the corresponding personalized identifiers to populate each of the one or more corresponding placeholders based on a type of each of the one or more corresponding placeholders and based on the user profile of the given user.

5. The method of claim 4, wherein the corresponding personalized identifier that is associated with the given user includes one or more of: a contact entry identifier associated with a contact entry of the given user, a media identifier associated with media of interest to the given user, a home automation device identifier of a home automation device associated with the given user, or a software application identifier of a software application accessible by the in-vehicle computing device.

6. The method of claim 1, further comprising:
receiving, from the given user and via the in-vehicle computing device, user input directed to the given candidate suggestion; and
in response to receiving the user input directed to the given candidate suggestion:
causing the in-vehicle computing device or an additional computing device, that is communicatively coupled to the in-vehicle computing device, to perform one or more corresponding actions associated with the given candidate suggestion.

7. The method of claim 6, wherein fulfillment data associated with each of the one or more corresponding actions is pre-cached in the on-device storage of the in-vehicle computing device.

8. The method of claim 6, further comprising:
in response to receiving the user input directed to the given candidate suggestion:
utilizing the user input directed to the given candidate suggestion as a feedback signal to update a ranking of the one or more candidate suggestions.

9. The method of claim 1, further comprising:
prior to causing the given candidate suggestion to be provided for presentation to the given user via the in-vehicle computing device:
processing, using one or more ranking machine learning (ML) models, the one or more candidate suggestions to rank the one or more candidate suggestions; and
selecting, based on the ranking, the given candidate suggestion to be provided for presentation to the given user via the in-vehicle computing device.

10. The method of claim 9, the one or more ranking ML models include one or more of: a global ranking ML model that is not personalized to the given user, or a personalized ranking ML model that is personalized to the given user.

11. The method of claim 1, further comprising:
identifying a latency measure associated with causing the given candidate suggestion to be provided for presentation to the given user via the in-vehicle computing device; and
utilizing the latency measure to modify a quantity of the one or more candidate suggestions that are stored in association with the given suggestion state or one or more additional suggestion states.

12. The method of claim 1, further comprising:
identifying, at the in-vehicle computing device, a subsequent occurrence of the given suggestion state;
obtaining, from the on-device storage of the in-vehicle computing device, the one or more candidate suggestions stored in association with the given suggestion state; and
causing, in response to identifying the subsequent occurrence of the given suggestion state, an additional given candidate suggestion, from among the one or more candidate suggestions, to be provided for presentation to the given user via the in-vehicle computing device, the additional given candidate suggestion being the same as the given candidate suggestion or another one of the one or more candidate suggestions.

13. The method of claim 1, further comprising:
prior to storing the one or more candidate suggestions in association with the given suggestion state in the storage accessible by the in-vehicle computing device:
processing, using a de-duplicating technique, the one or more candidate suggestions to prune any candidate suggestions, of the one or more candidate suggestions, that are not semantically diverse from the other candidate suggestions, of the one or more candidate suggestions.

14. An in-vehicle computing device of a vehicle comprising:
at least one processor; and
memory storing instructions that, when executed, cause the at least one processor to:
identify an occurrence of a given suggestion state associated with the in-vehicle computing device or a given user of the vehicle, wherein the occurrence of the given suggestion state is identified in response to detecting one or more contextual signals that trigger generating one or more candidate suggestions for the given user,
wherein the one or more contextual signals include one or more application contextual signals that characterize a state of a given software application accessible at the in-vehicle computing device of the vehicle of the given user, and
wherein the state of the given software application includes one or more of: an electronic communication being received by the given software application, a proactive notification associated with the given software application to be provided for presentation to the given user, or a reactive notification associated with the given software application to be provided for presentation to the given user;
in response to identifying the occurrence of the given suggestion state:
generate one or more candidate suggestions, wherein each of the one or more candidate suggestions is personalized to the given user for the given suggestion state, wherein the instructions to generate the one or more candidate suggestions comprise instructions to:
identify one or more suggestion templates stored in association with the given suggestion state;
identify one or more corresponding placeholders for each of the one or more suggestion templates; and
populate each of the one or more corresponding placeholders, for each of the one or more suggestion templates, with a corresponding personalized identifier that is associated with the given user to generate the one or more candidate suggestions; and
cause a given candidate suggestion, from among the one or more candidate suggestions, to be provided for presentation to the given user via the in-vehicle computing device;
store, in the storage of the in-vehicle computing device, the one or more candidate suggestions in association with the given suggestion state;
identify, at the in-vehicle computing device of the vehicle of the given user, a subsequent occurrence of the given suggestion state; and
in response to identifying the subsequent occurrence of the given suggestion state:
cause the given candidate suggestion, from among the one or more candidate suggestions, to be provided for presentation to the given user via the in-vehicle computing device.

15. A non-transitory computer-readable storage medium, of an in-vehicle computing device, storing instructions that, when executed by at least one processor, cause the at least one processor to perform operations, the operations comprising:

identifying, at an in-vehicle computing device of a vehicle of a given user, an occurrence of a given suggestion state for providing suggestions for presentation to the given user,
wherein the occurrence of the given suggestion state is identified in response to detecting one or more contextual signals that trigger generating one or more candidate suggestions for the given user,
wherein the one or more contextual signals include one or more application contextual signals that characterize a state of a given software application accessible at the in-vehicle computing device of the vehicle of the given user, and
wherein the state of the given software application includes one or more of: an electronic communication being received by the given software application, a proactive notification associated with the given software application to be provided for presentation to the given user, or a reactive notification associated with the given software application to be provided for presentation to the given user;
in response to identifying the occurrence of the given suggestion state:
generating, locally at the in-vehicle computing device, one or more candidate suggestions, wherein each of the one or more candidate suggestions is personalized to the given user for the given suggestion state, and wherein generating the one or more candidate suggestions comprises:
identifying one or more suggestion templates stored in association with the given suggestion state;
identifying one or more corresponding placeholders for each of the one or more suggestion templates; and
populating each of the one or more corresponding placeholders, for each of the one or more suggestion templates, with a corresponding personalized identifier that is associated with the given user to generate the one or more candidate suggestions; and
causing a given candidate suggestion, from among the one or more candidate suggestions, to be provided for presentation to the given user via the in-vehicle computing device;
storing, in on-device storage of the in-vehicle computing device, the one or more candidate suggestions in association with the given suggestion state;
identifying, at the in-vehicle computing device of the vehicle of the given user, a subsequent occurrence of the given suggestion state; and
in response to identifying the subsequent occurrence of the given suggestion state:
causing the given candidate suggestion, from among the one or more candidate suggestions, to be provided for presentation to the given user via the in-vehicle computing device.

* * * * *